United States Patent
Yi et al.

(10) Patent No.: US 9,538,456 B2
(45) Date of Patent: Jan. 3, 2017

(54) METHOD AND APPARATUS FOR PERFORMING DATA TRANSMISSION IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 14/766,949

(22) PCT Filed: Feb. 18, 2014

(86) PCT No.: PCT/KR2014/001310
§ 371 (c)(1),
(2) Date: Aug. 10, 2015

(87) PCT Pub. No.: WO2014/126445
PCT Pub. Date: Aug. 21, 2014

(65) Prior Publication Data
US 2015/0373626 A1    Dec. 24, 2015

Related U.S. Application Data

(60) Provisional application No. 61/766,086, filed on Feb. 18, 2013.

(51) Int. Cl.
*H04B 1/38* (2015.01)
*H04W 48/12* (2009.01)
(Continued)

(52) U.S. Cl.
CPC ........... *H04W 48/12* (2013.01); *H04B 1/7143* (2013.01); *H04W 24/08* (2013.01); *H04W 48/20* (2013.01); *H04W 74/0833* (2013.01)

(58) Field of Classification Search
CPC .. H04W 72/042; H04W 40/246; H04W 48/12; H04W 48/20; H04W 4/021; H04W 74/0833; H04J 11/0073; H04J 11/0076; H04J 11/0079; H04J 2211/001; H04B 1/7143
(Continued)

(56) References Cited

U.S. PATENT DOCUMENTS

2007/0004445 A1    1/2007    Dorsey et al.
2008/0227453 A1    9/2008    Somasundaram et al.
(Continued)

FOREIGN PATENT DOCUMENTS

EP    2 237 583 A1    10/2010
EP    2 675 078 A2    12/2013
(Continued)

OTHER PUBLICATIONS

3GPP, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)", 3GPP TS 36.300 V10.9.0, Dec. 2012, pp. 1-194.
(Continued)

*Primary Examiner* — Tesfaldet Bocure
(74) *Attorney, Agent, or Firm* — Birch, Stewart, Kolasch & Birch, LLP

(57) ABSTRACT

A method is provided for performing, at a wireless device, data transmission in a wireless communication system. The wireless device receives a configuration including a plurality of virtual cell groups, each of the virtual cell groups including two or more serving cells which share an identical virtual cell identification (ID). The wireless device also receives
(Continued)

discovery signals scrambled with the identical virtual cell ID and system information including a physical random access channel (PRACH) configuration, from master cells of each of the virtual cell groups. The wireless device selects a cell based on the discovery signals and system information, and performs a random access channel (RACH) procedure and data transmission by using the virtual cell ID of the selected cell.

15 Claims, 20 Drawing Sheets

(51) Int. Cl.
*H04W 48/20* (2009.01)
*H04B 1/7143* (2011.01)
*H04W 24/08* (2009.01)
*H04W 74/08* (2009.01)

(58) Field of Classification Search
USPC ........ 375/259, 354, 358, 219; 455/436–444; 370/328–338
See application file for complete search history.

(56) References Cited

U.S. PATENT DOCUMENTS

| | | |
|---|---|---|
| 2011/0263260 A1 | 10/2011 | Yavuz et al. |
| 2013/0315195 A1 | 11/2013 | Ko et al. |
| 2014/0204924 A1* | 7/2014 | Ryu .................... H04W 40/246 370/338 |
| 2015/0296551 A1* | 10/2015 | Kim ...................... H04W 60/00 455/426.1 |
| 2015/0326335 A1* | 11/2015 | Chen .................... H04J 11/0079 370/252 |
| 2015/0358899 A1* | 12/2015 | Ko ........................ H04W 48/16 370/252 |

FOREIGN PATENT DOCUMENTS

| | | |
|---|---|---|
| JP | 2012-253810 A | 12/2012 |
| KR | 10-2006-0062856 A | 6/2006 |
| WO | WO 2011/053534 A1 | 5/2011 |
| WO | WO 2012/108716 A2 | 8/2012 |
| WO | WO 2012/149559 A1 | 11/2012 |

OTHER PUBLICATIONS

LG Electronics, "Remaining issues for uplink RSs", 3GPP TSG RAN WG1 Meeting #70, R1-123937, Qingdao, China, Aug. 13-17, 2012, 3 pages.

* cited by examiner

Fig. 6
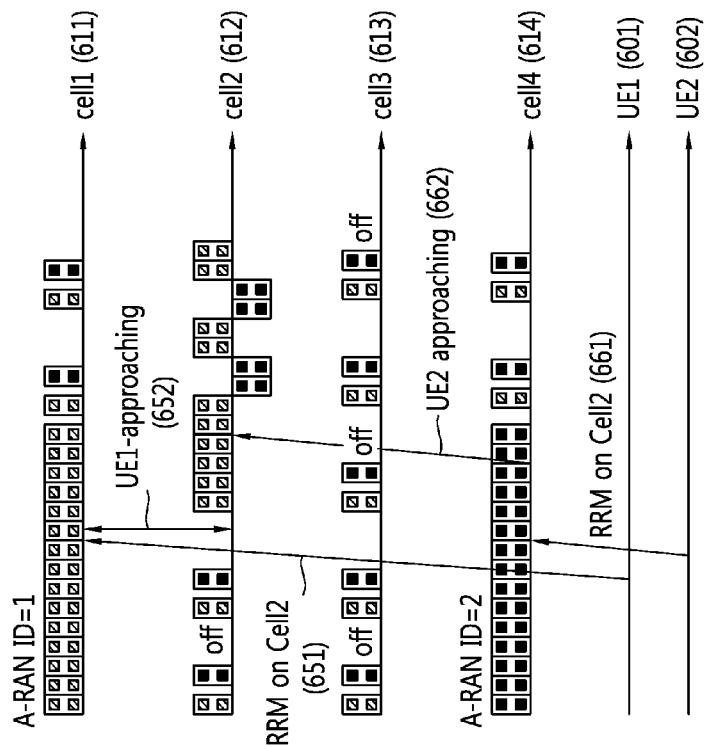
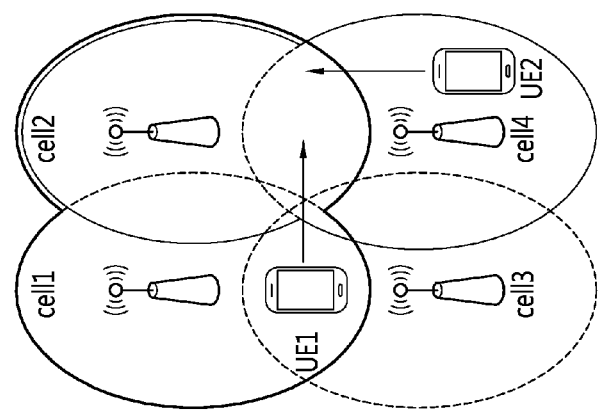

METHOD AND APPARATUS FOR PERFORMING DATA TRANSMISSION IN WIRELESS COMMUNICATION SYSTEM

CROSS REFERENCE TO RELATED APPLICATIONS

This application is the National Phase of PCT International Application No. PCT/KR2014/001310, filed on Feb. 18, 2014, which claims priority under 35 U.S.C. 119(e) to U.S. Provisional Application No. 61/766,086, filed on Feb. 18, 2013, all of which are hereby expressly incorporated by reference into the present application.

BACKGROUND OF THE INVENTION

Field of the Invention

The present invention relates to wireless communications, and more particularly, to a method and apparatus for performing data transmission in a wireless communication system consisting of multiple carriers over single frequency or multiple frequencies.

Related Art

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted (or eliminated) controls and UE in a small cell cluster environment needs to be defined. Furthermore, it is need to be defined to handle cell coverage in view of UE mobility.

SUMMARY OF THE INVENTION

The present invention provides a method and apparatus for performing data transmission in a wireless communication system.

The present invention also provides a method and apparatus for configuring two more serving cells which are shared an identical virtual cell identification cell in a wireless communication system.

The present invention also provides a method and apparatus for configuring a special cell set including two more serving cells and sharing an identical cell identification base on mobility in a wireless communication system.

In an aspect, a method for performing data transmission in a wireless communication system is provided. The method may includes receiving a configuration including virtual cell groups, the virtual cell group each including two more serving cells which are shared an identical virtual cell identification (ID); receiving discovery signals scrambled with the identical virtual cell ID and system information including a physical random access channel (PRACH) configuration, from master cells each of the virtual cell groups; selecting a cell based on the discovery signals and the system information; and performing a RACH procedure and data transmission by using the virtual cell ID of the selected cell.

The method may further include that the configuration includes at least two sets of a relationship between an identical virtual cell ID for a discovery signal and a physical cell IDs of serving cells in a virtual cell group sharing the identical virtual cell ID, wherein the configuration includes at least one of subframe sets of the virtual cell groups, and multiple subframes sets of the virtual cell group each, a set of the discovery signals transmitted from the serving cells in the virtual cell groups each.

In another aspect, an user equipment (UE) for performing data transmission in a wireless communication system is provided. The UE includes a radio frequency (RF) unit for transmitting and receiving a radio signal; and a processor operatively coupled to the RF unit, wherein the processor is configured for: receiving a configuration including virtual cell groups, the virtual cell group each including two more serving cells which are shared an identical virtual cell identification (ID); receiving discovery signals scrambled with the identical virtual cell ID and system information including a physical random access channel (PRACH) configuration, from master cells each of the virtual cell groups; selecting a cell based on the discovery signals and the system information; and performing a RACH procedure and data transmission by using the virtual cell ID of the selected cell.

The proposed embodiment shows that UE-mobility for dynamic coverage by changing cell, frequency hopping, and cell management in wide-band carriers is supported.

BRIEF DESCRIPTION OF THE DRAWINGS

FIG. 6 shows another amorphous RAN example which the present invention is applied.

DESCRIPTION OF EXEMPLARY EMBODIMENTS

Figure 1:
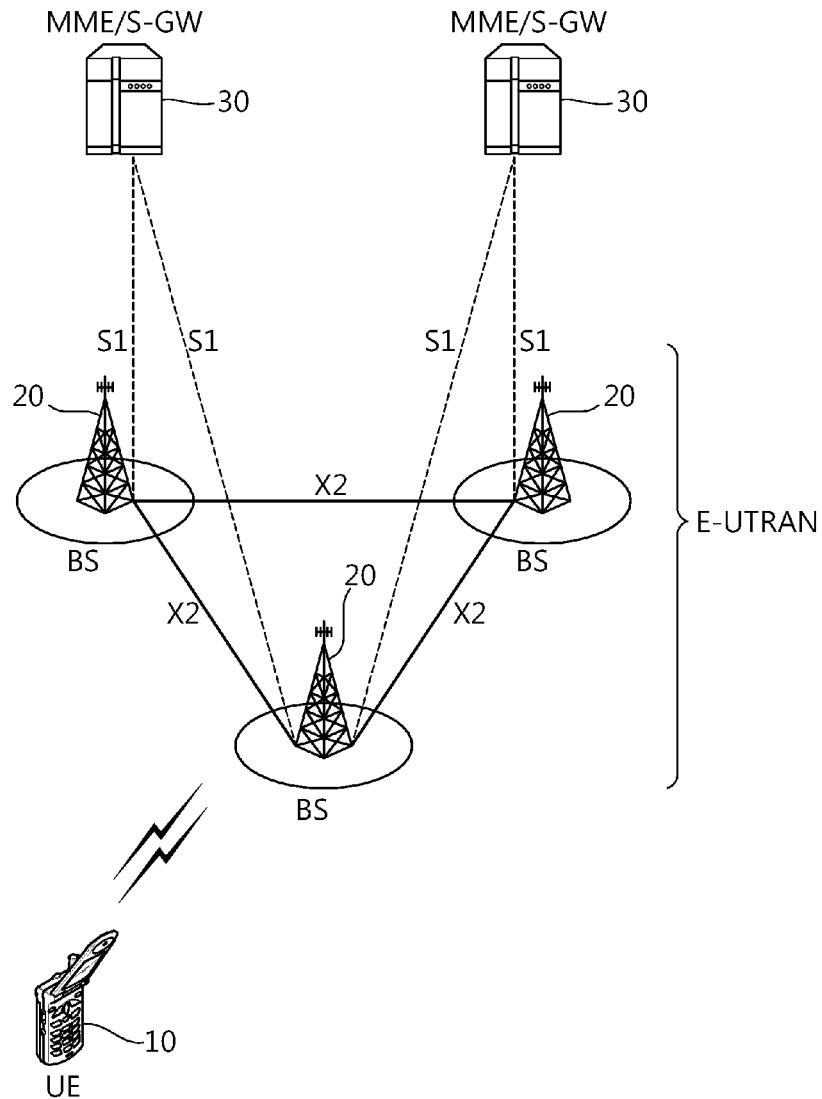
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The UE may support one or more carriers (Carrier 1 or more Carriers 2 . . . N) according to UE's capability thereof. To enhance the user throughput, it is also considered to allow inter-node resource aggregation over more than one eNB/node where a UE may be configured with more than one carrier groups. It is configured Primary Cell (PCell) per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation. More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 2:
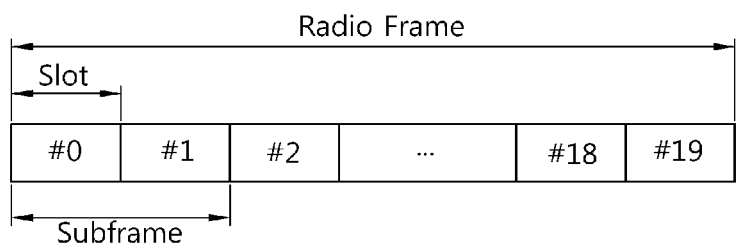
FIG. 2 shows a structure of a radio frame to which the present invention is applied.

FIG. 2 shows a structure of a radio frame to which the present invention is applied.

Referring to FIG. 2, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP.

For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number NDL of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH (enhanced PDCCH)) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain. The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a Channel Quality Indicator (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 3:
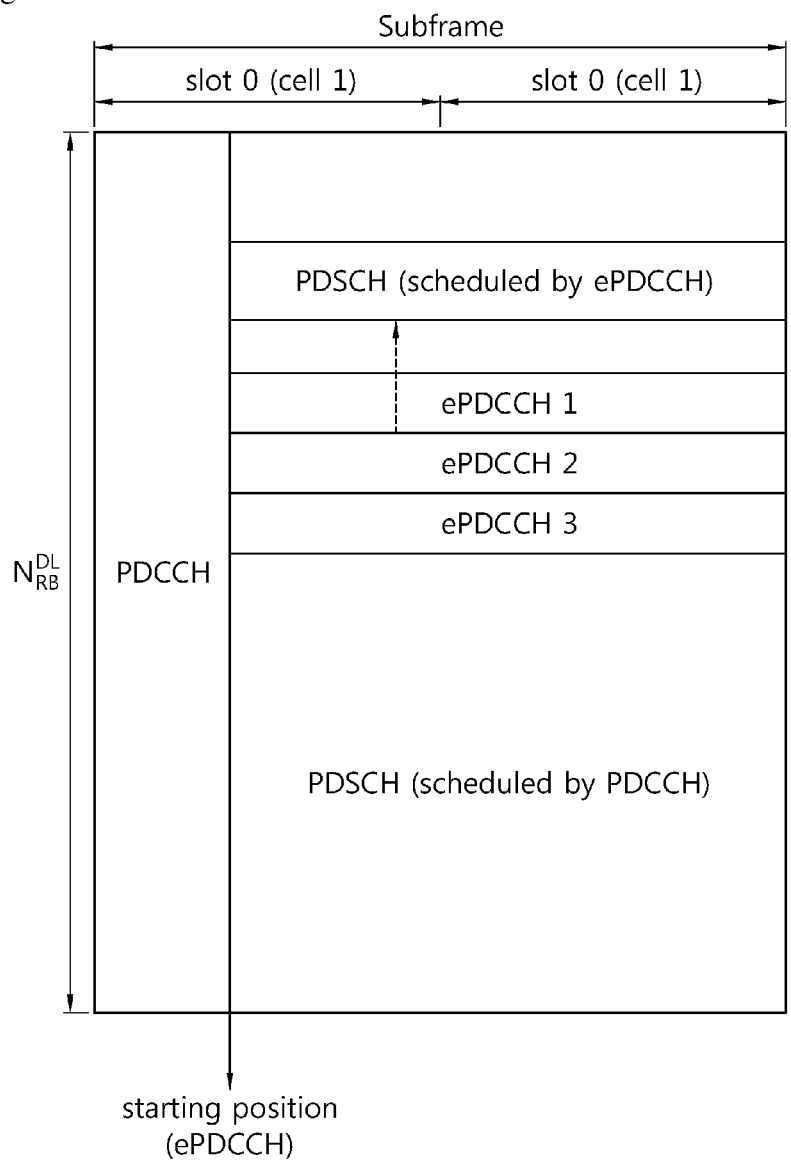
FIG. 3 shows downlink control channels to which the present invention is applied.

Herein, an ePDCCH can be one of solutions of limitation for a PDCCH transmission or new control information transmission of near future commination system including a new type of carrier as shown in FIG. 3. The ePDCCH which can be multiplexed with the PDSCH can support multiple Serving Cells (SCells) of the CA.

Referring to FIG. 3, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that Multimedia Broadcast multicast service Single Frequency Network (MBSFN) subframes exist in a new carrier (NC). Whether to use PDCCH in MBSFN subframes in NC and how many ODFM symbols will be allocated if used can be configured via RRC signaling. Further Transmission Mode (TM)10 and new TM mode of UE can be considered for new carrier type as well. Hereafter, new carrier type refers to a carrier where all or part of legacy signals can be omitted or transmitted in different manners. For example, a new carrier may refer a carrier where Cell-specific Reference Signal (CRS) may be omitted in some subframes or Physical Broadcast Channel (PBCH) may not be transmitted.

For this next LTE system or enhanced communication system, this proposed embodiment provides that the new carrier cell may be introduced in which all or some of the proposed backward compatible legacy signals and/or channels are not transmitted for reasons of the improvement of an interference problem between a plurality of cells, the enhancement of carrier extensibility, and an increase in the degree of freedom in providing advanced features. Even though the proposed invention is mainly described for the new carrier cell as an example, it does not limit to the new carrier cell only. It can be applied to legacy carriers without the loss of generality as well. More details, this invention considers cases where cell-specific RS used for tracking and the Radio Resource Monitoring (RRM) measurement would not be transmitted at all or transmitted only a subset of subframes different from legacy carrier. For a convenience, this invention shows an example where CRS or tracking RS is transmitted every 5 msec e.g., subframe #0 and #5 in each radio frame. More particularly, a new carrier may refer a carrier which performs cell on/off where eNB turns off transmissions upon no active UE attached or based on a pattern. If this is assumed, this invention shows an example where Primary Synchronization Signal (PSS)/Secondary Synchronization Signal (SSS)/CRS or a discovery signal based on Channel State Information Reference Signal (CSI-RS) is transmitted every T msec with a predetermined value e.g., T=200, or more than 200.

This proposed embodiment also supports an efficient transmission within a small cell cluster. More specifically, amorphous Radio Access Network (RAN) concept where a cell range changes dynamically based on UE mobility and a frequency hopping mechanism of a cell to utilize wider system bandwidth (>20 Mhz) without having the capability to process more than 20 Mhz is proposed. This proposed embodiment considers includes macro/small cell carrier-aggregation (CA), inter-site CA, or UE is connected to a small cell which belongs to a small cell cluster assuming a dense small cell deployment. In this scenario, interference coordination among cells would be essential as multiple small cells may compete each other to utilize the channel efficiently.

Figure 4:
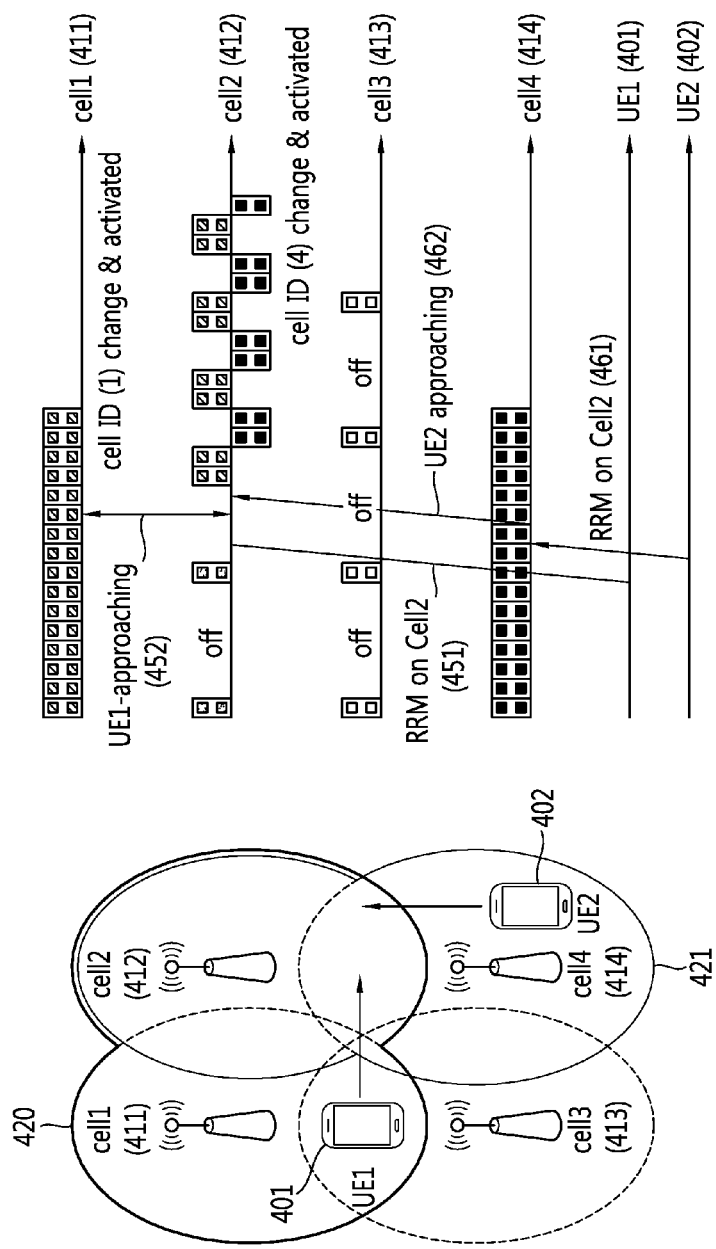
FIG. 4 shows an amorphous RAN example as exemplary embodiment of the present invention.

FIG. 4 shows an amorphous RAN example as exemplary embodiment of the present invention.

Referring to FIG. 4, one motivation to have amorphous RAN is to create a cell whose boundary changes dynamically depending on the presence of active UEs. A case where UE1 (401) moves from the area of cell1 (411) coverage to cell2 (412) coverage is assumed. Using current mechanisms, when UE1 (401) moves to cell2 (412) coverage, UE1 (401) will be handed over to cell2 (412) either by RRC reconfiguration or hard hand-over. In a small cell scenario, however, this may not be so efficient for a few reasons.

First, the number of UEs served in a small cell may not be so large. It will be in [10, 20] range whereas the number of hand-over occurrence may not be as negligible as the small cell coverage is limited. Thus, a switch among small cells within a cluster shall be performed very efficiently. Otherwise, a UE may pay huge overhead/cost to perform frequency hand-over among small cells.

Secondly, there are many scenarios where mobility prediction is feasible. For example, small cell clusters in a highway or busy street, the user mobility patterns are limited such that overlaid amorphous RAN, this case amorphous RAN may be predetermined rather than dynamically changed, it may be useful. The concept of amorphous RAN in the example is that for UE1 (401) of cell combined coverage (420) of cell1 (411) and cell2 (412) is a serving cell and for UE2 (402) combined coverage (421) of cell2 (412) and cell 4 (414) is the serving cell. Removing or eliminating the necessity of hand-over and creating a dynamic coverage changing cell bring a few significant benefits.

A combined coverage of cells includes reduced RRM measurement overhead. Since all cells are forming a virtual cell, other than inter-frequency RRM, a UE may not need to perform any other intra-frequency RRM measurement at least for small cells belonging to the same amorphous RAN. This is important for a UE in terms of power saving. And it supports reduced UE interruption time. Another benefit is to reduce or eliminate the interruption time due to hand-over. This is particularly important in small cell scenarios as UE is expected to receive/transmit high volume of data when it is active. Thus, interruption time due to handover would degrade the throughput significantly. It also supports reduced ping-pong effect. By eliminating hand-over within a cluster, too-early hand-over or frequent hand-over between small cells can be eliminated or reduced.

The reducing the overhead of RRM is very critical from the UE power consumption and processing overhead perspective. Considering a typical small cell cluster scenario where the number of small cells is around 10, a UE may be able to discover all small cells (i.e., 10 small cells) as it is densely deployed. In this case, a cell selection based on Signal-to-Noise plus Interference Ratio (SNIR) may not be as effective as all small cells are within good Signal-to-Noise Ratio (SNR) range if interference is controlled well. In this typical scenario, a UE may have to report RRM on 10 small cells. If a restricted measurement is assumed, a UE may have to monitor 10 different small cells in different configurations where a hand-over may occur only a few times. Overall, the RRM requirement compared to the usefulness of the reports is a big burden to a UE. To reduce this RRM overhead, one approach is not to configure any RRM measurement on a neighbor cell such that a UE may not perform neighbor cell RRM yet this approach may lead coverage hole issue. Another approach is to apply a Coordinated MultiPoint (CoMP) scenario in a small cell cluster. This approach adds a big burden to a UE as a CoMP set may consist of a large number of small cells whereas current CoMP set allows up to 3 cells. If a small number of cells are forming a CoMP set, it may not dynamically change its cell boundary based on UE mobility. Furthermore, this approach may not support power saving at the eNB side. Another approach is to enable amorphous RAN where the coverage of a cell changes dynamically depending on the active UEs.

It assumes that cell2 which does not have any active UE repeats dormant and off period. Herein, the off state of a cell includes that the cell dose not transmit any reference signal and control signal as a DTX (discontinuous transmission) cell like a deactivated cell. More specifically, the cell2 transmits only synchronization channel such as PSS and/or SSS or discovery signals and/or reference signals such as CRS/Timing Reference Signal (TRS) in dormant period. As an example, the cycle consists of 200 msec dormant period and 800 msec off period such that cell2 repeats transmitting synchronization signals and reference signals during 200 msec and completely off the transmission during 800 msec and repeat the process every 1 second. Either by UE measurement based on Sounding Reference Signal (SRS) or RRM measurement from a UE (401, 402), cell2 may acquire the information whether any UE is approaching or enters in its coverage (420, 421), the above example shows that the serving cell indicates the proximity of an UE. When a cell in an inactive cell detects an active UE approaching the cell, it may start the initiation of cell activation which includes the following procedure in FIG. 5.

Figure 5:
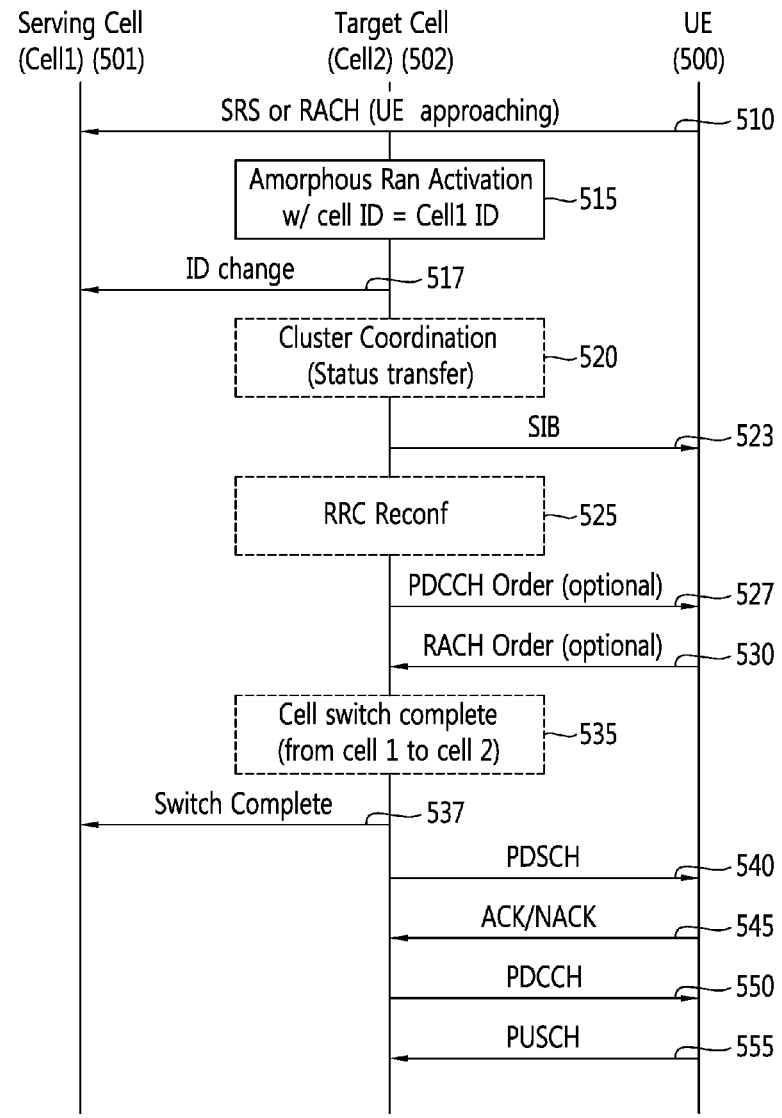
FIG. 5 shows an example of flowchart for cell switching which the present invention is applied.

FIG. 5 shows an example of flowchart for cell switching which the present invention is applied.

Referring to FIG. 5, when a cell2 notices that UE1 is approaching so that it may need to be prepared for a potential switch as a hand-over (510), it firstly changes that its cell ID to the same cell ID of cell1 which is a serving cell ID of an active UE (515). The active UE may transmit a request to wake up dormant neighbor cells when it is detected in its proximity. Once it changes it cell ID (517), it notifies its neighbor cells including the serving cell and necessary coordination including status transfer among small cells are accomplished (520). And the cell2 can transmit the status transfer to UE1 via a System Information Block (SIB) message (525).

Once it is completed, if a UE needs to switch its serving cell, cell2 or the current serving cell performs necessary RRC reconfiguration including configuration of ePDCCH set so that new configuration may be used in cell2. Optionally, PRACH can be transmitted to perform uplink synchronization (527, 530) since the cell2 configures PDCCH order to receives the PRACH from the UE. Once the switch is completed (535), cell2 notifies cell1 the completion of implicit hand-over and resumes normal data transmission (540, 545).

Here, the procedure notes that before the completion of implicit hand-over, cell1 which is the previous serving cell may continue data transmission to the UE. This is a cell activation procedure; the new cell is in dormant mode. Whereas, if the new cell is in active mode, i.e., it already serves more than one active UEs and a UE is approaching which is served by a serving cell with different cell ID, it needs to decide whether to active one more virtual cell or reject the UE depending on its load level, the number of serving UEs, the number of virtual cells, etc. The new cell may hand-over the existing serving UEs and accept the new UE depending on the QoS requirement of UEs, channel conditions, energy level, etc. Once it decides to create a virtual cell, the procedure for cell activation mentioned above the dormant mode can be performed to switch the cell implicitly.

When a cell becomes an active state from inactive state, to minimize the RRC reconfiguration and the necessity of hand-over, the cell may change its cell ID such that a target UE can seamlessly be attached to it. For example, the cell2 wakes up and becomes active state because of UE, the cell2 may choose cell1 as its cell ID so that UE1 can seamlessly communicate with cell2 without reconfiguration/reconnection/hand-over. Here, the cell changes its cell from Cell ID1 to Cell ID2 to support amorphous RAN concept, this proposed embodiment reviews how cell-specific and UE-specific signals and channels are transmitted upon the change or before the change.

Firstly, PUSCH is used by $c_{init} = n_{RNTI} \cdot 2^{14} + q \cdot 2^{13} + \lfloor n_s/2 \rfloor \cdot 2^9 + N_{ID}^{cell}$, where Radio Network Temporary Identifier (RNTI) of UE and cell ID would be the same as before. The C_ID2 is used for cell ID. PUCCH can use a virtual ID configured by higher layer or cell ID (C_ID2). PDSCH also use C_ID2 for cell ID, the cell ID can be replaced by virtual cell ID. It is used by $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}.$$

And, CRS is used by $c_{init} = 2^{10} \cdot (n_s+1) + l+1) \cdot (2 \cdot N_{ID}^{V\_cell}+1) + 2 \cdot N_{ID}^{V\_cell} + N_{CP}$, where $N_{ID}^{V\_cell}$ is a virtual cell ID broadcasted by discovery signal or Synchronization Channel (SCH). This cell ID can be different from cell ID used to generate CSI-RS sequence. MBSFN RS is the same as before. Demodulation Reference Signal (DM-RS) is used as $c_{init} = (\lfloor n_s/2 \rfloor + 1) \cdot (2n_{ID}^{(nSCID)}+1) \cdot 2^{16} + n_{SCID}$, where $n_{ID}^{(i)} = N_{ID}^{V\_cell}$, if no value for $n_{ID}^{DMRS,i}$ is provided otherwise $n_{ID}^{(i)} = n_{ID}^{DMRS,i}$. For ePDCCH, a new ePDCCH set may be configured when the physical transmission point changes. The ePDCCH scrambling and configuration follows the Rel-11 specification.

If a cell needs to support more than one UE attached to different cell IDs, it may create multiple virtual cells with each cell ID to support different UE where virtual cells may be multiplexed in a TDM fashion or FDM fashion.

FIG. 6 shows another amorphous RAN example which the present invention is applied. It shows an approach to realize amorphous RAN is described as below.

Referring to FIG. 6, the definition of amorphous RAN (ARAN) i.e., keeping the same cell regardless of UE mobility can be vague. More, some characteristics from UE perspective can be considered for amorphous RAN concept. A hand-over procedure would not be occurred even though physical cells may change which form the same virtual cell where a UE is associated with. A basic measurement such as RRM/Radio Link Monitoring (RLM) does not have to be restarted. In other words, continuous measurement can be performed. Discontinuous Reception (DRX) can be continued. There is no need to reacquire SIB unless SIB changes.

Main differences of A-RAN from CoMP scenario are followed. An ID used for generating cell-specific RS is not tied with a physical cell ID. A cell is assigned with a physical cell ID which can be used as an identifier among small cells. This ID would not be used for synchronization channel or cell-specific reference signal. Rather, a different ID will be used for cell-specific reference signal which are shared among cells within the A-RAN. This ID is called as A-RAN ID.

Each cell may transmit discovery signals with multiple A-RAN IDs in inactive state. In other words, each cell can become any A-RAN supported in the small cell cluster when it becomes active state. In other words, each cell does not broadcast its physical cell ID as an identifier of the cell. Rather, its ID is determined based on the user requirement. More specifically, in dormant mode, a cell advertises multiple A-RANs. In active state, one or multiple A-RANs can be activated among advertised A-RANs in dormant/off state. In terms of configuring an A-RAN, a few approaches are feasible.

A-RAN can be a small cell cluster. In this case, small cells within a cluster share the same A-RAN ID and form an A-RAN. But, a small cell cluster may form multiple A-RANs. In this case, a cluster master or a cell with the lowest ID within a cluster or based on pre-determined rule, each A-RAN may be assigned with a master cell which performs initial access for a UE and also transmits system information including master information block if needed. When the master is not in the coverage of a UE who attempts to connect to the A-RAN, another cell may perform initial access. A-RAN may be formed across small cell clusters. In this case, A-RAN may not be tied with any small cell cluster.

When A-RAN is considered, it is also considerable to decouple RRM and RLM including different cell ID that UE should monitor for each measurement such that a UE would change physical cell identified by RRM, whereas it does not change virtual cell or data transmission point or transmission point which transmits control channels identified by RLM or vice versa. This invention focuses on RRM overhead reduction; however, to maintain the serving cell regardless of physical cell change, RLM might be more important. Thus, applying A-RAN concept to reduce Radio Link Failures (RLF) is not precluded. The details of amorphous RAN concept with RLM overhead reduction are described.

In terms of an eNB behavior, the different behavior in terms of transmitting cell-specific RS and/or synchronization channels and/or discovery channels may be expected when it serves active UE(s) or not.

When an active UE is attached to a cell which is in active state, a cell may belong to only one A-RAN or more than one A-RAN. If it belongs to only one A-RAN, it will transmit cell specific RS and/or synchronization channels and/or discovery channels using the A-RAN ID. If it belongs to multiple A-RANs, time-division or frequency-division fashion of multiplexing will be performed to behave as if multiple A-RANs. For the simplicity, a cell may not be configured with multiple A-RANs (i.e., only one A-RAN can be configured to an eNB).

For example, when UE2 approaches to cell2, cell2 may not support UE2 as it is already supporting UE1 with A-RAN ID=1. In this case, cell2 may change its A-RAN ID to 2 and support UE2 instead of supporting UE1. When it does, if it cannot find any other cells to switch UE1 over, it may hand-over UE1 to A-RAN ID=2. In terms of making a decision which A-RAN each eNB will belong to, each eNB may use UE requirement such as QoS requirement, the number of UEs in each A-RAN, RRM measurement reports, etc to maximize the network resource utilization.

When an active UE is not attached to the cell which is inactive state, in inactive state, a cell may transmit multiple discovery channels with different A-RAN IDs as if there are multiple A-RANs. For example, within a cluster, three A-RANs are formed, an inactive eNB may transmit discovery signals with three different A-RAN IDs. The timing or frequency to transmit discovery signals with each A-RAN ID would be different per A-RAN. In terms of RRM and hand-over, all procedure is based on A-RAN and A-RAN ID rather than a cell ID or physical cell used in macro-cell.

The approaches of defining an A-RAN ID are following. A new ID as A-RAN ID not associated with existing PSS and/or SSS, a new ID may be assigned to each A-RAN which will be used for discovery channel sequence generation. The discovery sequence may use both A-RAN ID and physical cell ID. Or, A-RAN ID may be tied with PSS, 0, 1 or 2 may be used for A-RAN IDs. In other words, a small cell cluster may not have more than three A-RANs. In this case, a small cell cluster ID can be transmitted via SSS. Or, A-RAN ID may be with SSS, IDs carried in SSS may be used for A-RAN IDs where PSS can identify the cluster ID. In this case, the number of small cell cluster that a UE can identify is three. Or, A-RAN ID tied with PSS and SSS, 0, 1 or 2 may be used for A-RAN IDs. A small cell cluster ID can be transmitted via SSS. The ID of A-RAN consists of {A-RAN ID within a cluster, a cluster ID} similar to physical cell ID. In this case, how to generate each RS or control or data channel is described briefly in below. The discovery signal may carry information to identify A-RAN ID. Also, synchronization channels can be transmitted to identify A-RAN ID or a virtual cell ID which will be used for transmitting cell-specific RS, if A-RAN ID is not used for cell-specific RS sequence and if PSS/SSS are used.

PUSCH is set by $c_{init}=n_{RNTI} \cdot 2^{14}+q \cdot 2^{13}+\lfloor n_s/2 \rfloor \cdot 2^9+N_{ID}^{A-RAN}$ and, PUCCH uses a virtual ID configured by higher layer or A-RAN ID. PDSCH is set by $$c_{init} = \begin{cases} n_{RNTI} \cdot 2^{14} + q \cdot 2^{13} + \lfloor n_s/2 \rfloor \cdot 2^9 + N_{ID}^{A-RAN} & \text{for PDSCH} \\ \lfloor n_s/2 \rfloor \cdot 2^9 + N_{ID}^{MBSFN} & \text{for PMCH} \end{cases}$$

CRS is set by $c_{init}=2^{10} \cdot (7 \cdot (n_s+1)+l+1) \cdot (2 \cdot N_{ID}^{A-RAN}+1)+2 \cdot N_{ID}^{A-RAN}+N_{CP}$, where $N_{ID}^{A-RAN}$ is a A-RAN ID broadcasted by discovery signal or SCH. MBSFN RS is the same as before. DM-RS is set by $c_{init}=(\lfloor n_s/2 \rfloor+1) \cdot (2n_{ID}^{(nSCID)}+1) \cdot 2^{16}+n_{SCID}$, where $n_{ID}^{(i)}=N_{ID}^{A-RAN}$ if no value for $n_{ID-DMRS,i}$ is provided otherwise $n_{ID}^{(i)}=n_{ID}^{DMRS,i}$. A new ePDCCH set may be configured when the physical transmission point changes. The ePDCCH scrambling and configuration follows the Rel-11 specification with cell ID=A-RAN ID. CSI-RS is set by $c_{init}=2^{10} \cdot (7 \cdot (n_s+1)+l+1) \cdot (2 \cdot N_{ID}^{CSI}+1)+2 \cdot N_{ID}^{CSI}+N_{CP}$, where $N_{ID}^{CSI}$ is equal to $N_{ID}^{A-RAN}$ unless higher layer signaling indicates otherwise.

When a discovery signal is transmitted in off-state with periodicity of P to allow transmitting multiple A-RAN IDs by inactive cells, offset may be used for each A-RAN ID where each discovery signal with A-RAN ID=k is transmitted at subframe i if (i+k) % P=0. A cell may transmit discovery signals which are supported by itself only. For example, if a cell supports A-RAN ID=1 and A-RAN ID=2, only two discovery signals with A-RAN ID=1 and A-RAN ID=2 will be transmitted by the eNB. In terms of transmitting RS including tracking RS, three approaches are feasible. It is used A-RAN ID as if a cell ID. It is used a combination of A-RAN ID and cluster ID, e.g., A-RAN ID*Max Cluster ID+cluster ID. It is used a virtual cell ID, the virtual cell ID may be transmitted by PSS/SSS, where the virtual cell ID may be equal to physical cell ID of the cell or given by a higher layer signaling.

When a UE reports a RRM report, it may transmit the A-RAN ID along with RRM report, in addition to a cell ID or a virtual cell ID if it is known to the UE or only A-RAN ID which replaces cell ID in the report. Since multiple cells may share the same A-RAN ID, to identify the signal strength or channel quality from an eNB to a UE, each eNB may use SRS or Random Access Channel (RACH) for channel estimation from the UE. When a UE measures path-loss to determine PRACH initial power, it may use only system information transmission since discovery channels may be transmitted in System Frame Number (SFN) fashion. If a UE transmits a PRACH or pre-PRACH without receiving system information, e.g., system information is received from macro cell or a new uplink channel is used, path-loss may be assumed to be fixed, i.e., initial power is prefixed. Or, an eNB may transmit a specific signal for a UE to measure the channel for channel estimation, it is similar to Channel State Information (CSI) request.

Figure 7:
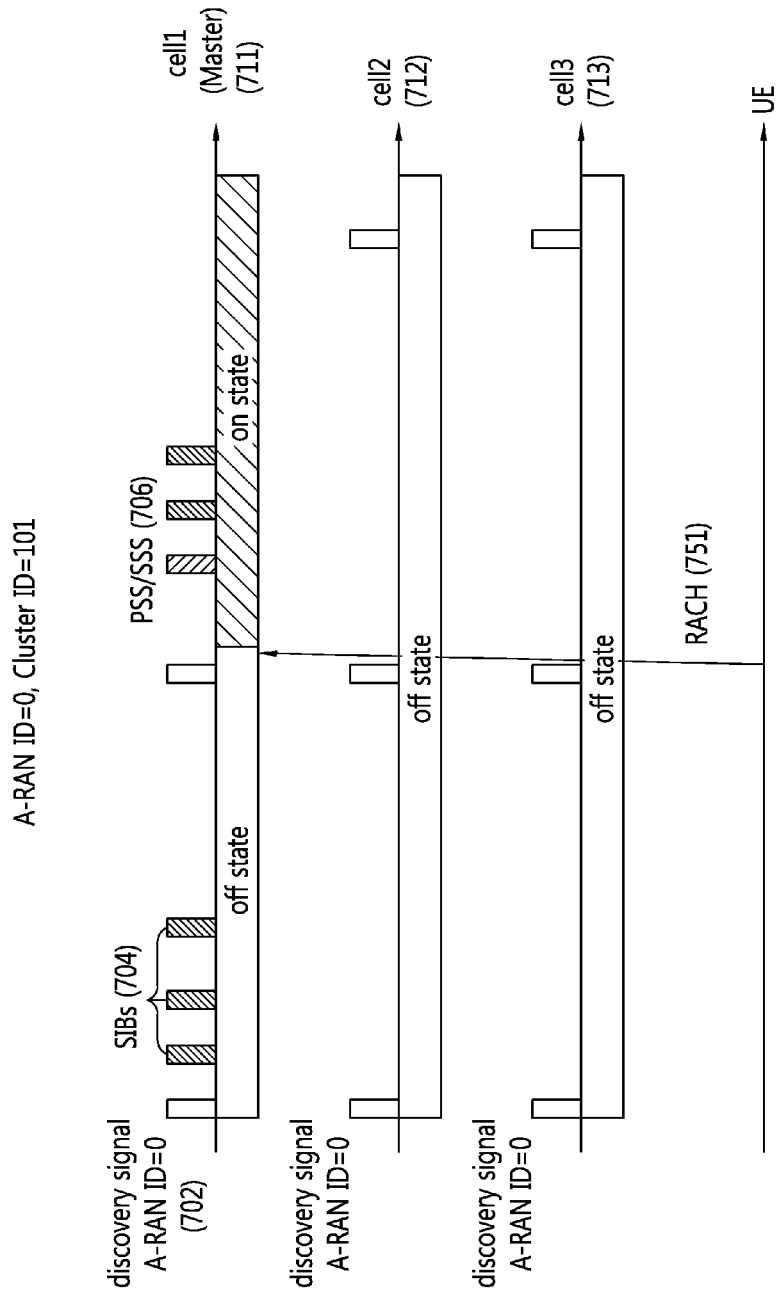
FIG. 7 and FIG. 8 show an initial procedure using an A-RAN ID as exemplary embodiment of the present invention.
Figure 8:
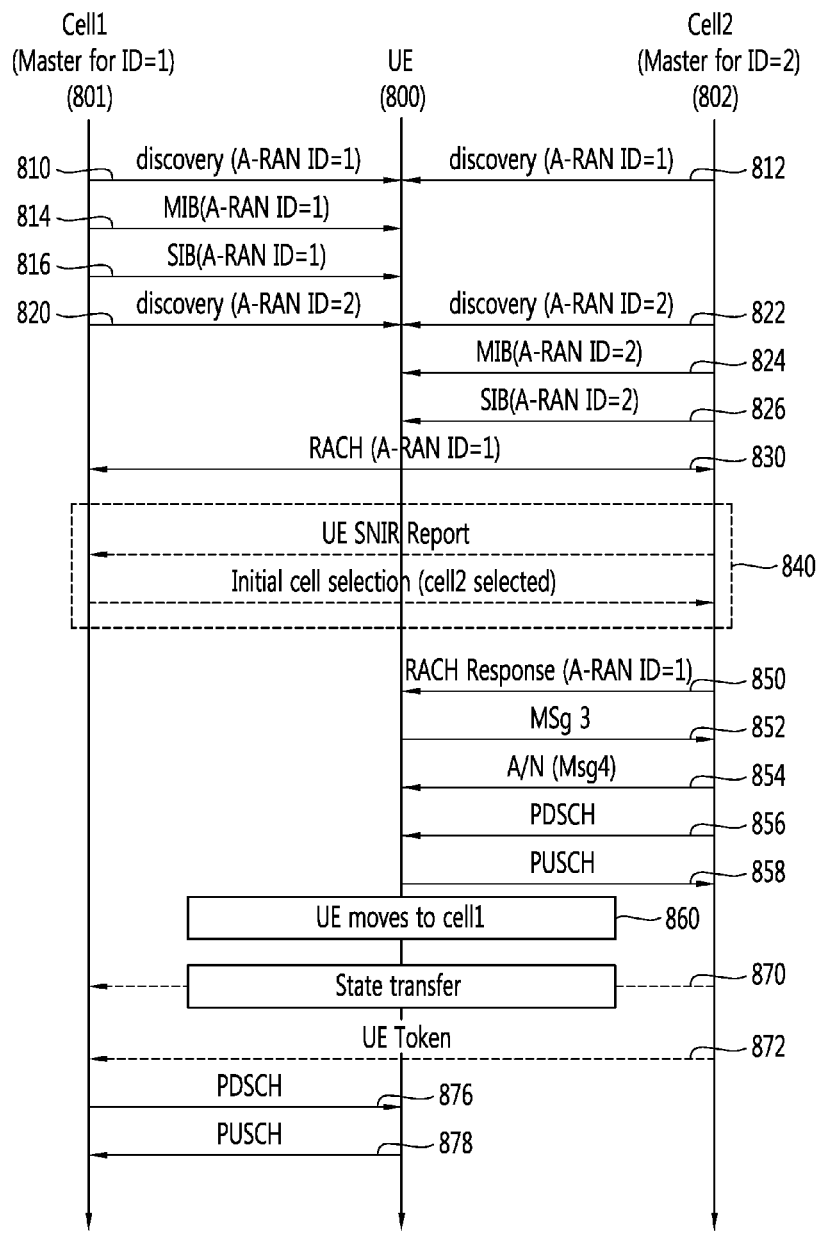

FIG. 7 and FIG. 8 show an initial procedure using an A-RAN ID as exemplary embodiment of the present invention.

Referring to FIG. 7, when a UE is in a hand-over from a macro-cell to an A-RAN in small cell cluster, all the necessary information may be transmitted by the macro-cell. With or without the macro-cell's aid, the following steps are assumed for an initial access as shown.

Discovery of A-RAN is firstly described. A UE firstly may sync-signals transmitted in active state such as PSS/SSS and/or discovery signals. If a UE detects an active A-RAN, it attempts to attach via RACH procedure, it can be used with the same as legacy RRC connection procedure. For the same frequency, if a UE is not able to find an active A-RAN, UE searches inactive A-RAN by reading discovery signals. It may repeat the cell search on different frequencies following the priority configured.

When an A-RAN is identified, the following procedure is performed to be attached. A master cell of each A-RAN transmits necessary system information that a UE needs (711). A cluster master may be a master for all A-RANs within the cluster. RACH or pre-RACH can be configured, when a UE identifies a candidate A-RAN, it may transmit a RACH or pre-RACH which is similar to RACH or SRS (751). The configuration and resource used for this message is either pre-determined or carried in system information. A cell either after coordination between cells or a cell with the lowest cell ID or a cell predetermined as a master for the A-RAN sends a response for the RACH or pre-RACH. When a pre-RACH is transmitted, a response can be transmitted by multiple cells via SFN which may include the RACH configuration. If that occurs, the following RACH based on the received configuration can be transmitted. Once the cell setup is completed, normal downlink and uplink transmission occurs. It notes that initial access in off state may not be supported for a legacy UE which is not aware of dormant state of a cell.

For more details, the UE receives discovery signals with A-RAN ID=1 from the cell1 and cell2 (810, 812), and receives Master Information Block (MIB/SIB) having A-RAN ID=1 (814, 816).

Also the UE receives discovery signals with A-RAN ID=2 from the cell1 and cell2 (820, 822), and receives MIB/SIB having A-RAN ID=2 (824, 826). Here, the cell1 is a master cell among small cells to have A-RAN ID=1 and the cell2 is a master cell among small cells to have A-RAN ID=2.

And then, the UE decides to attach a cell which has A-RAN ID=1 to transmit PRACH where the configuration of PRACH is transmitted by the SIB (830). The UE send SNIR report to cell1 as a master cell in small cell cluster have A-RAN ID=1 to perform cell selection, the cell2 is selected as an attached cell (840). The UE receives RACH response from the cell2, the RACH response includes A-RAN ID=1 (850). The RACH procedure is completed by transmitting Msg3, and Msg 4 (852, 854). The UE communicates normal data transmission by PDSCH and PUSCH with cell2 (856, 858).

Meanwhile, the UE moves to cell1 during the data transmission (860), the data transmission is maintained with the cell2 or, state transfer can be occurred (870). For the state transfer, the UE communicates normal data transmission by PDSCH and PUSCH with cell1 since the serving cell of the data transmission is switched to a physical cell1 from cell2 as creating UE token with user RNTI allocated to (872, 876, and 878).

Figure 9:
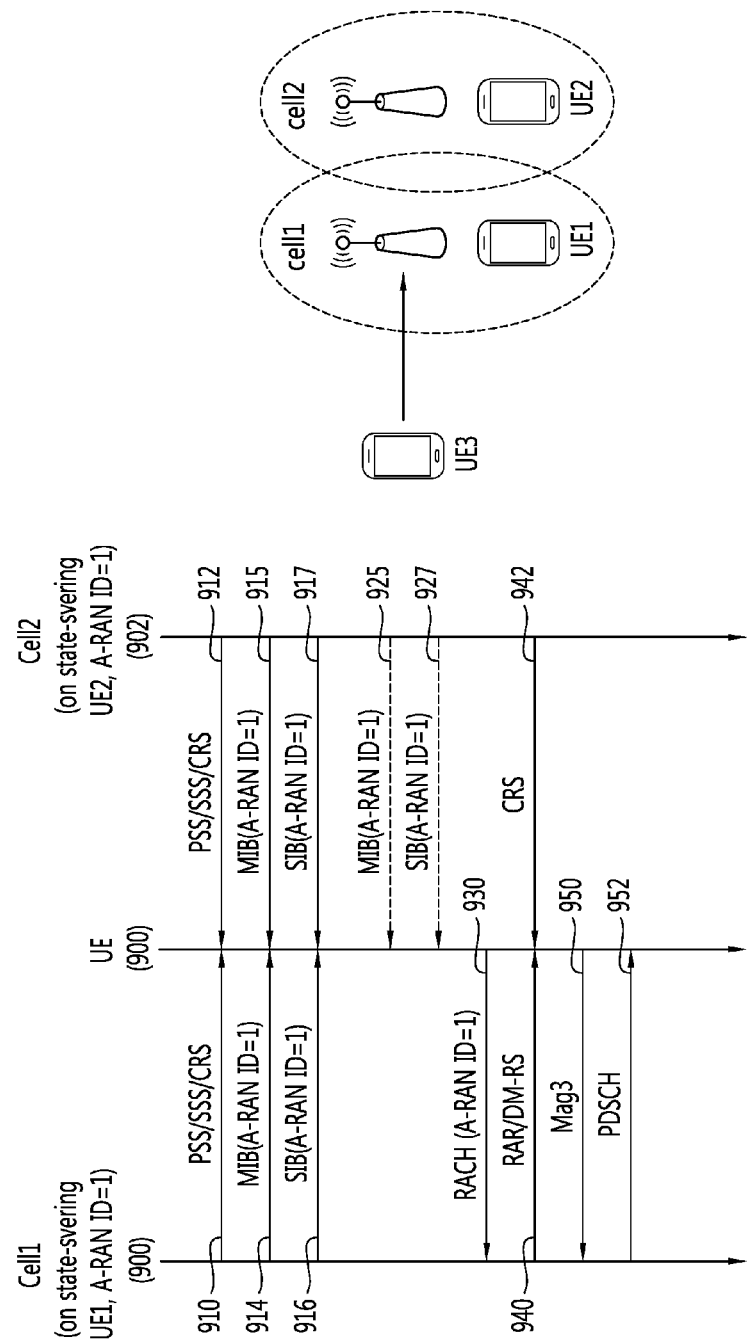
FIG. 9 shows an example of initial access procedure in on-state A-RAN which the present invention is applied.

More details, an initial access procedure in on-state A-RAN is described with FIG. 9. When a UE attempts to connect to an A-RAN when it discovers any on-state cell, in terms of ID delivered via PSS/SSS, three alternatives can be considered that PSS/SSS carries A-RAN ID and cluster ID, PSS/SSS carries a virtual cell ID, or PSS/SSS carries physical cell ID. In this invention, it is assumed that PSS/SSS including A-RAN ID and cluster ID, or PSS/SSS carrying a virtual cell ID is used for A-RAN scenario.

An UE performs normal RRM on PSS/SSS/CRS which are transmitted in SFN fashion (910, 912). In terms of receiving MIB/SIB in on-state, two mechanisms are considered. One approach is that all active cells within an A-RAN transmit simultaneously MIB and/or SIBs so that a UE is able to receive with higher reliability. Another approach is to use offset between MIB and SIB transmissions from each active cell within an A-RAN so that a UE may read one or multiple MIB/SIBs.

As shown, the UE receives MIB/SIB having A-RAN ID=1 from the cell1 and/or cell2. Herein, if the SIB TX timing is aligned the cell2 transmits the MIB/SIB at the same time with cell1 (914, 915, 916, 917) and if the SIB TDM is used the cell2 transmits the MIB/SIB at the different time with cell1 (925, 927).

After reading MIB/SIBs, a UE may transmit PRACH where the configuration of PRACH is transmitted by the SIB. Each cell within an A-RAN may use different PRACH preamble sequences or resources so that by reading a PRACH, the target cell is identified. How to allocate different preamble sequences for each cell or resource is done by coordination among cells within a cluster. This approach may be applicable only when each cell transmits SIB in different time or different frequency. If SIB transmission is done in SFN fashion, different configurations per cell may not be given to a UE. In that case, it is up to the network to decide which cell is going to send Random Access Response (RAR) to the UE.

Once a cell has received the PRACH from an UE, it responds with RAR. Different from the legacy operation, CRS may not be used for RAR decoding as CRS may be transmitted from multiple cells simultaneously which may deteriorate the quality of channel estimation for data demodulation. Multiple approaches are feasible to address this issue. One is to limit transmission of CRS from other cells except for the cell sending RAR so that CRS-based data demodulation is still feasible. Another approach is to use DM-RS for RAR demodulation. In this case, the scrambling of DM-RS is done based on preamble sequence index or PRACH transmitted subframe index or PRACH resource configuration index rather than user RNTI as user RNTI may not be available. If DM-RS is used for data demodulation in A-RAN scenario, the frequency of CRS can be reduced in every 5 msec only for tracking purpose. The last approach is that all active cells may transmit the same RAR in SFN fashion.

As shown, the UE receives RAR/DM-RS from the cell1 and CRS from cell for data demodulation (940, 942). The RACH procedure is completed by transmitting Msg3, and Msg 4 for normal data transmission (950, 952).

When a UE is attached to a cell with A-RAN ID=k, if the cell is the first cell within a cluster with that A-RAN ID or a UE is changed from RRC_Idle to RRC_Connected, and thus cell camp-on occurs, the eNB creates a token with user RNTI allocated to the UE which will be forwarded when a serving cell of a physical cell switches. For example, if a cell2 becomes a serving cell since UE1 moves from cell1 range to cell2 range, cell1 delivers the token of UE1 to cell2 so that cell2 can initiate downlink and uplink to UE1. All the necessary transfer of information between cell1 and cell2 will be occurred before the token is transmitted. It notes that this can be applicable to the case as well where amorphous RAN is achieved by utilizing physical/virtual cell ID change.

Furthermore, Multiple Frequency Handling is described. When there are large bandwidths available such as 100 MHz where a small cell eNB can handle 20 MHz at a time, a mechanism of frequency hopping can be considered to fully utilize the whole bandwidth. An example of frequency hopping is shown in FIG. 10.

Figure 10:
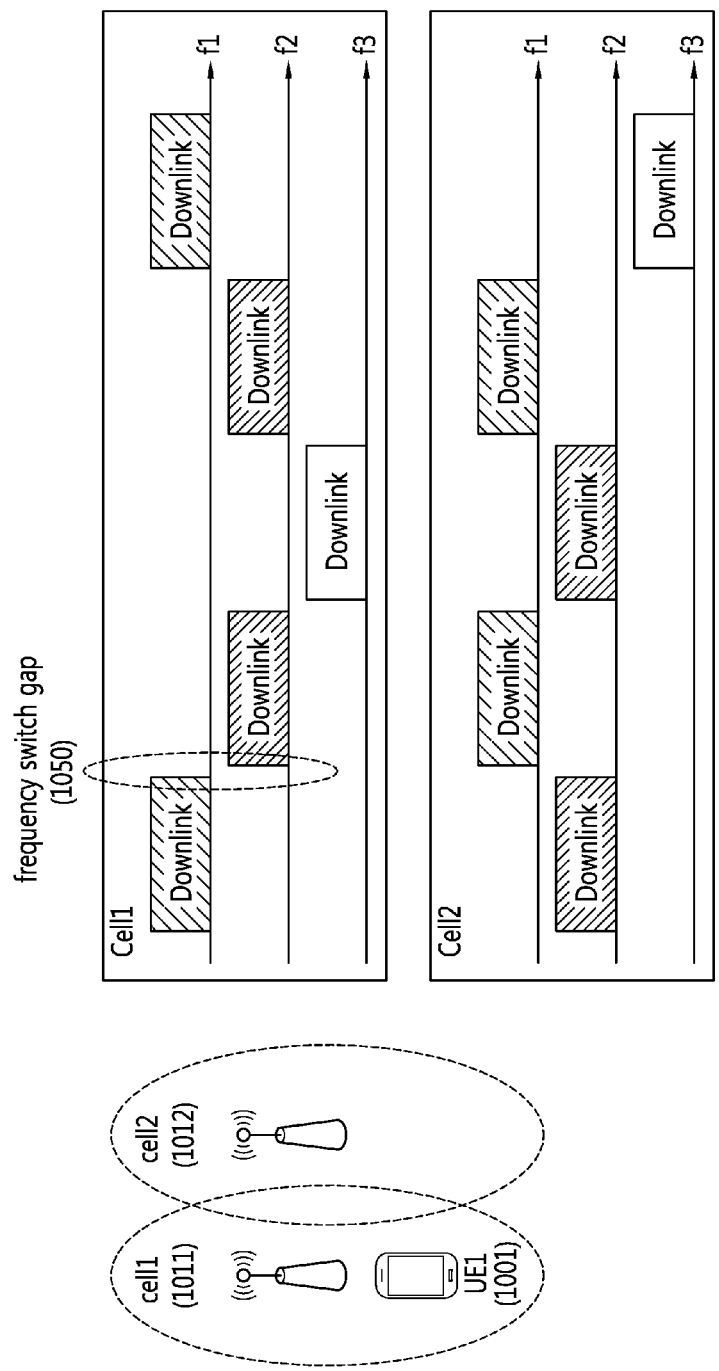
FIG. 10 shows an example of a frequency hopping which the present invention is applied.

FIG. 10 shows a frequency hopping as exemplary embodiment of the present invention. The frequency hopping is described with multiple 20 Mhz system bandwidths.

Referring to FIG. 10, for configuring the hopping pattern, a multiple approaches can be feasible. A predetermined hopping pattern which is associated with cell ID is used, regardless of whether an eNB belongs to a small cell cluster or not, it may hop the frequency based on a predetermined hopping pattern. The duration that the eNB stays in one frequency may be fixed in the predetermined hopping pattern as well. An indicated hopping pattern decided within a small cell cluster is used; each small cell cluster may assign an ID within a cluster to each eNB such that the ID can be used to decide the hopping pattern. If 5 hopping patterns are defined, a pattern each eNB can use may be determined by eNB_ID_Within_Cluster % 5. Or, a predetermined hopping pattern which is associated with the ID assigned within a cluster may be used instead.

Indication of hopping pattern can be applied this following ways. Firstly, a macro cell or a PCell aids indication, when a cell behaves as a SCell only, system information may be transmitted by the PCell or the macro cell which also includes the frequency hopping pattern that the SCell is using along with SFN so that a UE can determine the right frequency to locate the SCell. Indication of hopping pattern can be signaled via MIB, as another approach is to deliver the information via MIB. If this approach is used, the frequency used for 40 msec while MIB codewords are transmitted shall be remained as the same. Moreover, to allow UE to locate the cell by reading synchronization channels such as PSS and SSS within the required time, the same frequency may be used within a predetermined time such as 200 msec. A higher layer signaling can be used. Either the hopping pattern or a new frequency to hop, a higher layer signaling can be given to a UE to inform the change. Dynamic signaling via DCI can be used. By using DCI, an eNB may inform the hopping type and/or hopping duration and/or hopping enabled/disabled and/or hopping command. For example, a DCI may inform to the UE to apply hopping type which may be applicable to the next downlink subframes until a new hopping pattern or type is indicated or during the time indicated by the DCI for a new frequency.

For RRM in frequency hopping environments can be described as followings. Even though the eNB may not change its cell ID even with a new operating frequency, a UE shall report a separate RRM per each operating frequency. If an eNB is operating more than one frequency using either frequency hopping or other means, UE may report multiple RRM measured in each frequency separately. For neighbor cell RRM measurement, thus, it may be necessary to inform the hopping pattern of a neighbor cell to the UE if the UE is not able to infer the hopping pattern from cell ID or ID within a cluster. A UE shall not combine RRM measurement taken from different frequency. And for Frequency Hopping Gap, when an eNB changes its frequency from f1 to f2, it may require a gap for switching gap (1050). The gap may be given to the last subframe of f1 or the first subframe of f2. Desirably, the gap may be given to the last few OFDM symbols of the last subframe of the first frequency to protect potential legacy PDCCH or PHICH located in the first few OFDM symbol of a subframe. When a downlink frequency hopping occurs, the linked uplink frequency may be hopped as well. For example, if f1 is associated with u_f1 and f2 is associated with u_f2, when downlink frequency changes from f1 to f2, the uplink frequency changes from u_f1 to u_f2 as well.

Figure 11:
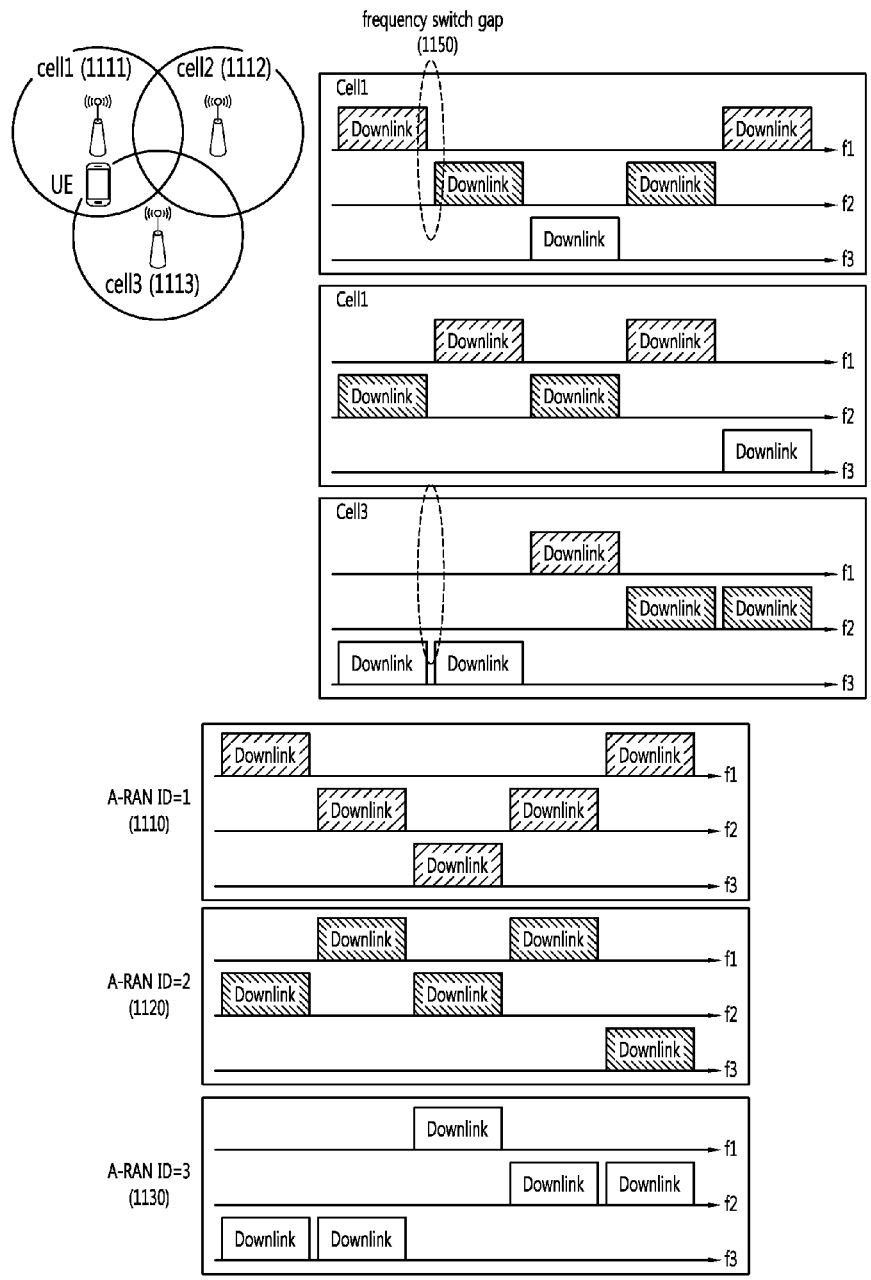
FIG. 11 shows an example of a UE-transparent frequency hopping which the present invention is applied.

Furthermore, A-RAN ID Change by changing operating frequency is described with FIG. 11. The FIG. 11 shows a UE-transparent frequency hopping as exemplary embodiment of the present invention.

For example, f1 is used for a cell with A-RAN ID=1 where physical eNB using the A-RAN ID changes over time. A UE is served in f1 will be served by cell1→>cell2→cellcell3 3→cell2→cell1 respectively, whereas the A-RAN ID that RS/control/data will be coded is kept the same as A-RAN ID=1. The benefit of this approach is to allow seamless connectivity to a UE where a UE may need to be aware of the gap between cell switch due to frequency change latency. Even though A-RAN ID does not change, physically, a UE is served by multiple cells in a TDM fashion. This may offer load balancing among cells each cell may support a high-load UE in a round-robin fashion. A physical/virtual cell ID can be used instead of A-RAN ID. Alternatively, frequency hopping may be done where a UE may not change its frequency.

As shown, the A-RAN ID=1 serves to UE with cell1→cell2→cell3→cell2→cell1 in a TDM fashion. The A-RAN ID=2 serves to UE with cell2→cell1→cell2→cell1→cell 3, and the A-RAN ID=3 serves to UE with cell3→cell3→cell1→cell2→cell2 in a TDM manners.

Figure 12:
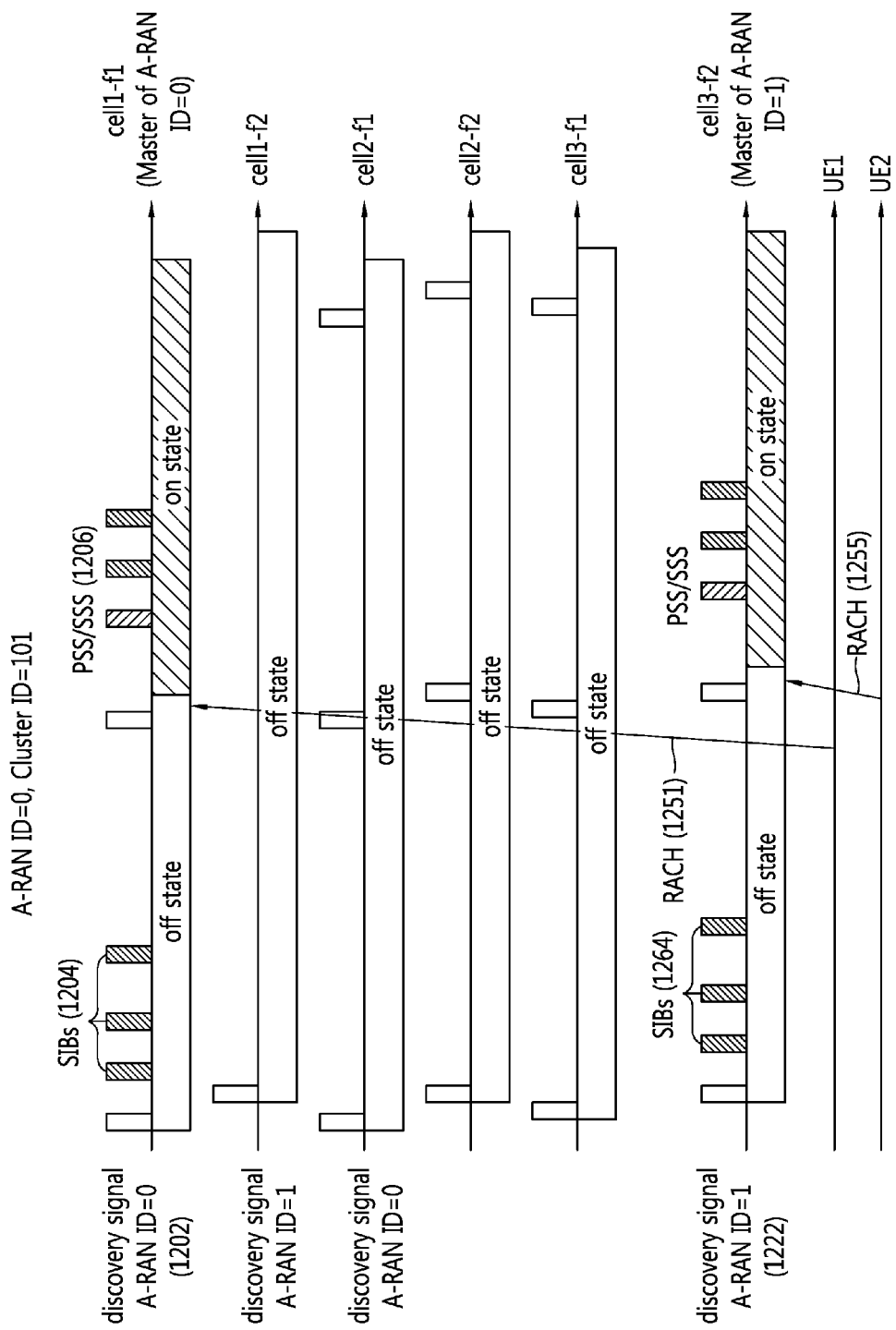
FIG. 12 shows an example of A-RANs in Multi-frequency environments which the present invention is applied.

Instead of using pre-fixed hopping pattern at each cell, A-RAN may be deployed in each frequency as well. FIG. 12 shows A-RANs in Multi-frequency environments as exemplary embodiment of the present invention.

A-RAN ID=0 is deployed in f1, A-RAN ID=1 is deployed in f2. If this is applied, each cell advertises multiple A-RANs in different frequency in off state (e.g., A-RAN ID=0 discovery signal in f1, A-RAN ID=1 discovery signal in f2 for a cell1) and when it becomes an active state, it may continue on state in one frequency to support one A-RAN (e.g., A-RAN ID=0 for cell1 in active state for UE1, A-RAN ID=1 for a cell3 in active state for UE2) as shown in FIG. 12. If this approach is used, the time of transmitting discovery signal at different frequency shall be coordinated with consideration of frequency switching delay.

This approach will also enable the amorphous RAN where a number of users is small (e.g., 10) then a cluster may assign a separate frequency for each UE where each eNB may operate multiple virtual cells with different frequency. When a UE with a certain frequency (e.g., f1) moves near to the cell, it will enable a virtual cell with f1 so that seamless connectivity is supported for that UE.

So the UE 1 attaches cell1-f1 by performing RACH to cell1-f1 after receiving the discovery signal with A-RAN ID=0 and SIBs, the UE 1 receives PSS/SSS from the cell1-f1 as a master cell of A-RAN ID=0, the cell1-f1 is on state. Whereas, the UE 2 attaches cell3-f2 by performing RACH to cell3-f2 after receiving the discovery signal with A-RAN ID=1 and SIBs, the UE 2 receives PSS/SSS from the cell3-f2 as a master cell of A-RAN ID=1, the cell3-f2 is on state. The signals from the cell3-f2 may be transmitted at subframes with predetermined offset of values from subframe in which the signals from the cell1-f1 are transmitted.

Figure 13:
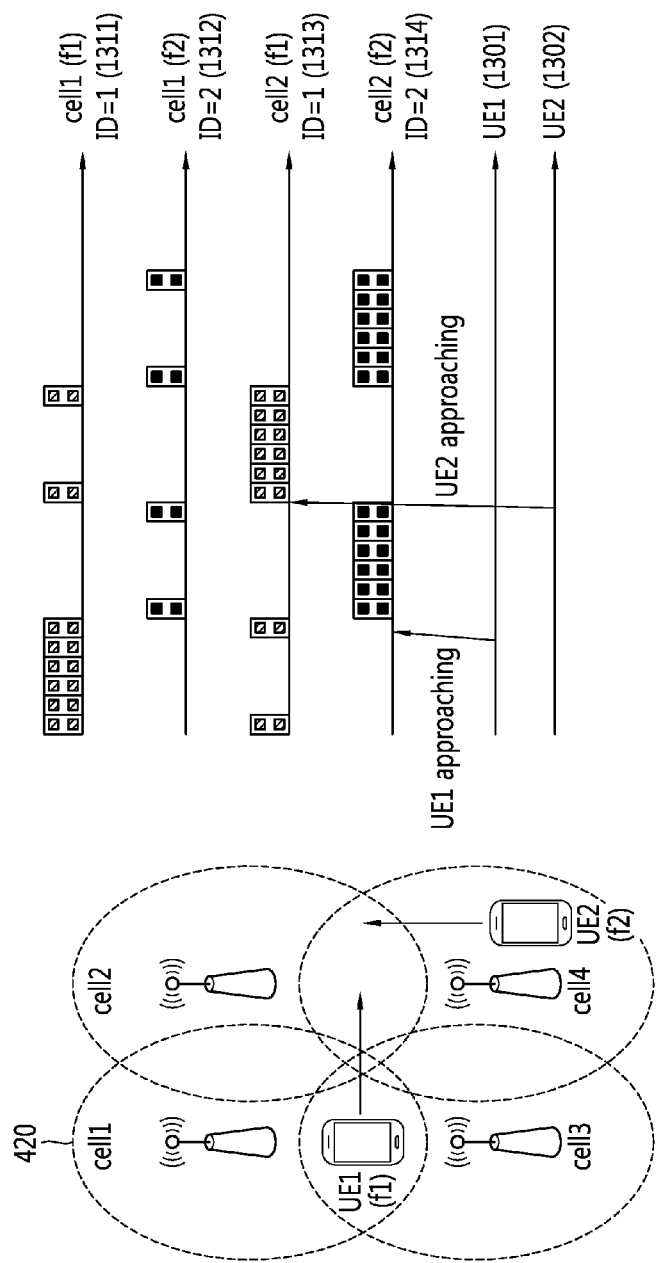
FIG. 13 shows an example of amorphous RAN via virtual cell ID in multi-frequencies as exemplary embodiment of the present invention.

FIG. 13 shows an example of amorphous RAN via virtual cell ID in multi-frequencies as exemplary embodiment of the present invention.

When a number of frequencies can be used is less than the number of UEs supported, a TDM mechanism mentioned in above can be used in combination of multiple frequency virtual cell. To enable a virtual cell, a discovery signal may be transmitted in each frequency so that a UE is able to discover a virtual cell in that frequency. Herein the UE1 is approaching the f1 including cell1 (f2) and cell2 (f2) with virtual cell ID=2, and the UE2 is approaching the f1 inluding cell1 cell2(f1) and cell2cell2(f1) with virtual cell ID=1.

An approach is to apply CoMP among small cells such that a UE is served by the same frequency where the serving cell switches its frequency to different frequency, a neighbor cell using the same frequency may serve the UE such as using Dynamic Point Selection (DPS). To enable this, a UE is configured with multiple cells for a CoMP operation. A UE is configured to receive data using DPS dynamically via DCI signaling or hopping pattern may be given so that a UE is expecting to receive all downlink data from a Transmission Point (TP) in a TDM fashion where downlink data includes both control and data. Difference from DPS enabled by DCI is that it will also enable to receive control from a different TP without configuring ePDCCH set separately. In other words, multiple cells via TDM support one UE without reconfiguration. RLM can be occurred regardless of physical cell change. It notes that eNB used here does not refer a physical base station. It is rather a logical concept which operates a carrier or a cell. Notably, Remote Radio Head (RRH) can be an eNB in this sense. A physical base station may have multiple eNBs in this sense. This concept can be applied to a single frequency case where each cell may form a few A-RANs via TDM or FDM fashion and multiple cells collaboratively support a UE via TDM.

Hereinafter, signal design for dormant A-RAN is discussed. For discovery signal is firstly described. To allow SFN transmission of discovery signal, it is assumed that longer CP is used for discovery signal than a CP used in normal data transmission in active state. It may be assumed that extended CP is assumed for discovery signal. Based on Positioning Reference Signal (PRS), in terms of sequence generation, slot number may not be used. Sequence may carry the information of system bandwidth where discovery signal will be transmitted. For sequence generation, the reference-signal sequence $r_l(m)$ is defined by For sequence generation, the reference-signal sequence $$r_l(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1,$$

where l is the OFDM symbol number within the slot. The pseudo-random sequence c(i) is defined. The pseudo-random sequence generator shall be initialized with $c_{init}=2^{10} \cdot (7 \cdot (M+1)+l+1) \cdot (2 \cdot N_{ID}^{A-RAN}+1)+2 \cdot N_{ID}^{A-RAN}$ at the start of each OFDM symbol where M={1, 2, 4} represents the bandwidth of discovery signal, e.g., 1 implies discovery signal bandwidth is 6 Physical Resource Block (PRB), 2 implies 25 PRB, 4 implies 50 PRB.

The bandwidth for discovery signal is given by the sequence and the cell-specific frequency shift may not be used. If it is used, it is given by $v_{shift}=+2 \cdot N_{ID}^{A-RAN}$ mod 6. Density of discovery signal compared to PRS can be increased to improve the performance. One example is shown in FIG. 14.

Figure 14:
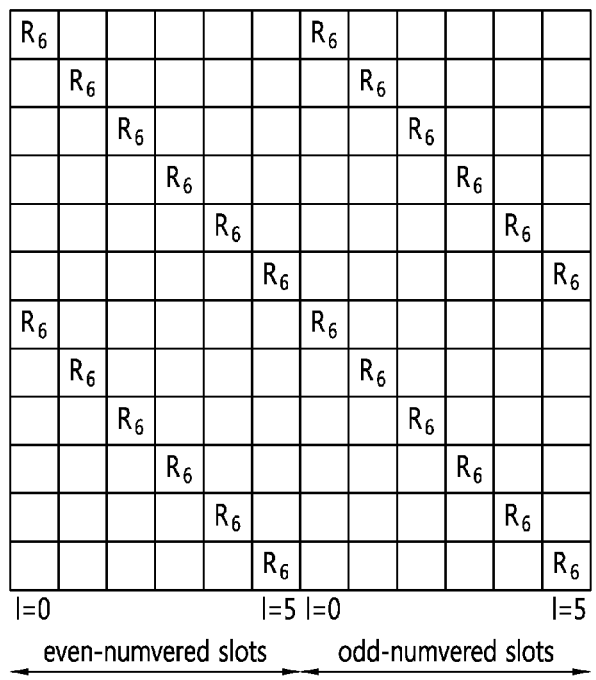
FIG. 14 is a mapping of discovery signals in extended cyclic prefix according to an embodiment of the present invention.

FIG. 14 is a mapping of discovery signals in extended cyclic prefix according to an embodiment of the present invention.

A subframe configuration for the discovery signals may be prefixed or determined by periodicity and offset configured by higher layer signaling. Note that the antenna port of transmitting discovery signal may not be defined or it may be assumed that discovery signal and DM-RS used in system information transmission in dormant state may be assumed to be quasi-collocated. Furthermore, discovery signal antenna port and PSS/SSS/CRS used in active state may not be assumed to Quasi Co-Location (QCL). Or, higher layer indication may be given to indicate the QCL relationship to discovery signal. Based on PSS/SSS, if PSS/SSS is used for A-RAN discovery signal, PSS may be used for transmitting A-RAN ID and SSS may be used for transmitting cluster ID.

For System information, the master cell of each A-RAN transmits system information including master information block. System information transmitted in dormant mode may be limited to only MIB and SIB1 or SIB2 or new SIB or a combined SIB of MIB/SIB1/SIB2. System information may be carried without associated PDCCH or ePDCCH following discovery signal. After transmitting discovery signal, the start transmission of system information will occur in K msec, e.g., K=1 indicates immediate SIB transmission. As keeping the PBCH design of a legacy carrier, system information may be carried over the next 40 mesc with a default DM-RS pattern used for PBCH decoding. This system information message may be different from legacy PBCH or PBCH transmitted in active state. It may include only essential information to allow a UE to transmit RACH so that a cell can become an active state. For example, system bandwidth and RACH configuration may be the content of system information transmitted in dormant state. A UE may not require performing blind decoding of PBCH transmitted in dormant state to identify the number of antenna ports which will be carried in active state PBCH if needed.

Figure 15:
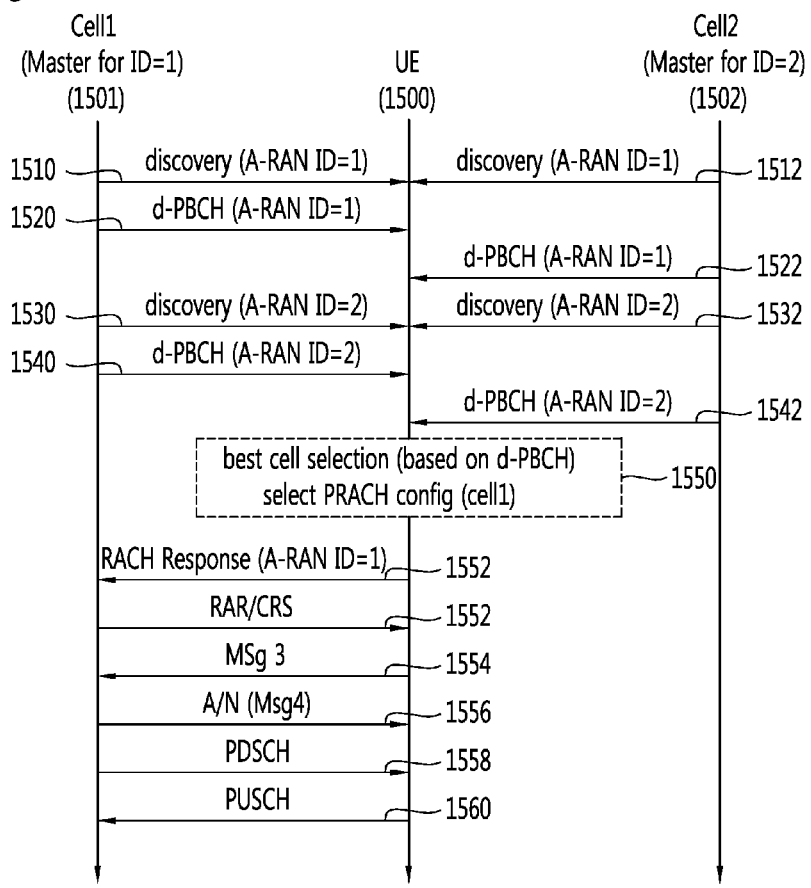
FIG. 15 is a signaling flow according to an embodiment of the present invention.

As described, it is proposed that a master cell per A-RAN transmits MIB and/or SIB in dormant state to avoid unnecessary overhead. Considering a case where the coverage of each cell may not be fully overlapped, it is still worthwhile to consider transmitting MIB and/or SIB from each cell. FIG. 15 is a signaling flow according to an embodiment of the present invention.

Referring to FIG. 15, PBCH-like combined system information is transmitted in dormant mode; one simple way is to transmit this d-PBCH as dormant mode PBCH by each cell in a TDM fashion. For example, cell nodes are advertising A-RAN with ID=0 and discovery signal is transmitted every 1 second. Then, d-PBCH may be transmitted with offset of multiple of 10 radio frames. For example, a cell with its ID, the ID assigned within a small cell cluster=0 transmits d-PBCH in the first radio frame since the discovery signal transmission and a cell with ID=1 transmits d-PBCH after 10 radio frames since the discovery signal transmission and so on. This may increase the latency or overhead at the UE to acquire d-PBCH since it may need to monitor multiple radio frames. If this approach is used, a UE may perform path-loss measurement by reading d-PBCH assuming power used for d-PBCH is either pre-fixed or signaled within d-PBCH or signaled in discovery signal and use the information to transmit a PRACH. Each d-PBCH may carry the PRACH configuration preamble sequence and subframe configurations potentially which a UE can use. A UE uses the PRACH configuration advertised by the best cell based on estimated path-loss information. The initial access on off-state based on TDM-fashioned d-PBCH. The d-PBCH can be demodulated either by CRS or DM-RS. PMCH may be supported in dormant state as well. MBSFN subframe configuration and other necessary information may be carried by an active small cell or macro cell as dormant A-RAN may not transmit MBSFN configuration information in dormant state.

Furthermore, It is expected that legacy UEs and advanced UEs may coexist. Not to degrade the performance of legacy UEs, desirably, A-RAN scenario would support legacy UEs. This section discusses how to support legacy UEs in A-RAN scenarios. First approach is overlaid of legacy cells and A-RAN cells. One simple approach is to deploy legacy carries and A-RAN carriers so that legacy UE can be attached to legacy carriers and advanced UEs can be attached to A-RAN carriers. Yet, this approach may still lead coverage hole for a legacy UE when not enough legacy carries are deployed. Second approach is overlaid of active A-RAN cells and on/off A-RAN cells. Another approach is to deploy at least a few A-RAN carriers active all the time which can support legacy UEs. Third approach is used for on/off A-RAN cells which support legacy UEs at least on active state.

To realize the 2 or 3 approach, at least active state A-RAN carrier should be able to support legacy UEs. Initial access procedure is assumed, signaling design considerations to support a legacy UE needs. Firstly, PSS/SSS/CRS is similar to CoMP scenario so that a user may be able to receive SFN transmitted PSS/SSS/CRS where CRS is scrambled with physical cell ID. One example of transmitting IDs over PSS/SSS is to split A-RAN ID and cluster ID to PSS and SSS (i.e., 0-2 for A-RAN ID, 0-167 for cluster ID or vice versa) and thus physical cell ID will be combined of A-RAN ID and cluster ID (e.g., 1 for A-RAN ID and 108 for cluster ID→cell ID=276). CRS will be scrambled with this cell ID (combined A-RAN ID and cluster ID). Note that instead of cluster ID, a virtual cell ID can be used instead. And PBCH can be either transmitted from multiple if there are active cells simultaneously or each active cell transmits PBCH with 40 msec in turn i.e., a cell transmit PBCH in first 40 msec, another transmits PBCH in next 40 msec. SIB transmission can be either transmitted from multiple active cells simultaneously or take a turn similar to PBCH where the interval may be different as SIB window is a multiple of 40 msec. RAR can be either SFN transmitted or other active cells may reduce power on CRS or not transmit CRS so that channel estimation for data demodulation based on CRS is not affected by multiple same ID active cells. The similar treatment shall be done for PDSCH transmission based on CRS as well.

The UE receives discovery signals with A-RAN ID=1 from a cell1 as a master cell for the ID=1, and a cell2 as a master cell for the ID=2 (1510, 1512). And then the UE receives d-PBCH with A-RAN ID=1 from the cell1 and the cell2, the d-PBCH may carry the PRACH configuration preamble sequence and subframe configurations potentially which a UE can use for the A-RAN ID=1 (1520, 1522). Also the UE receives discovery signals with A-RAN ID=2 from the cell1 and the cell2 (1530, 1532). And then the UE receives d-PBCH with A-RAN ID=2 from the cell1 and the cell2, the d-PBCH may carry the PRACH configuration preamble sequence and subframe configurations potentially which a UE can use for the A-RAN ID=2 (1540, 1542). The UE choose the best cell selection based on the d-PBCH, and selects PRACH configuration for cell1 (1550). So the UE send RACH preamble with the A-RAN ID=1 to cell1 (1552), responses the RAR/CRS (1554), and sends Msg 3 (1556) and receives Msg4 as A/N (1558). Data transmission using PDSCH and PUSCH is performed between the UE and cell1 (1558, 1560).

Another simple approach is to select a master cell which is transmitting MIB/SIB and can send RAR and configure RRC parameters. Once it is established, a legacy UE can be configured with DM-RS based transmission mode which will allow receiving data from other cells than the master cell as well. In this case, cells within an A-RAN may behave as if they are in the same CoMP set of scenario case. Non-master cells or the non-serving cells may still support initial access for advanced UEs.

Figure 16:
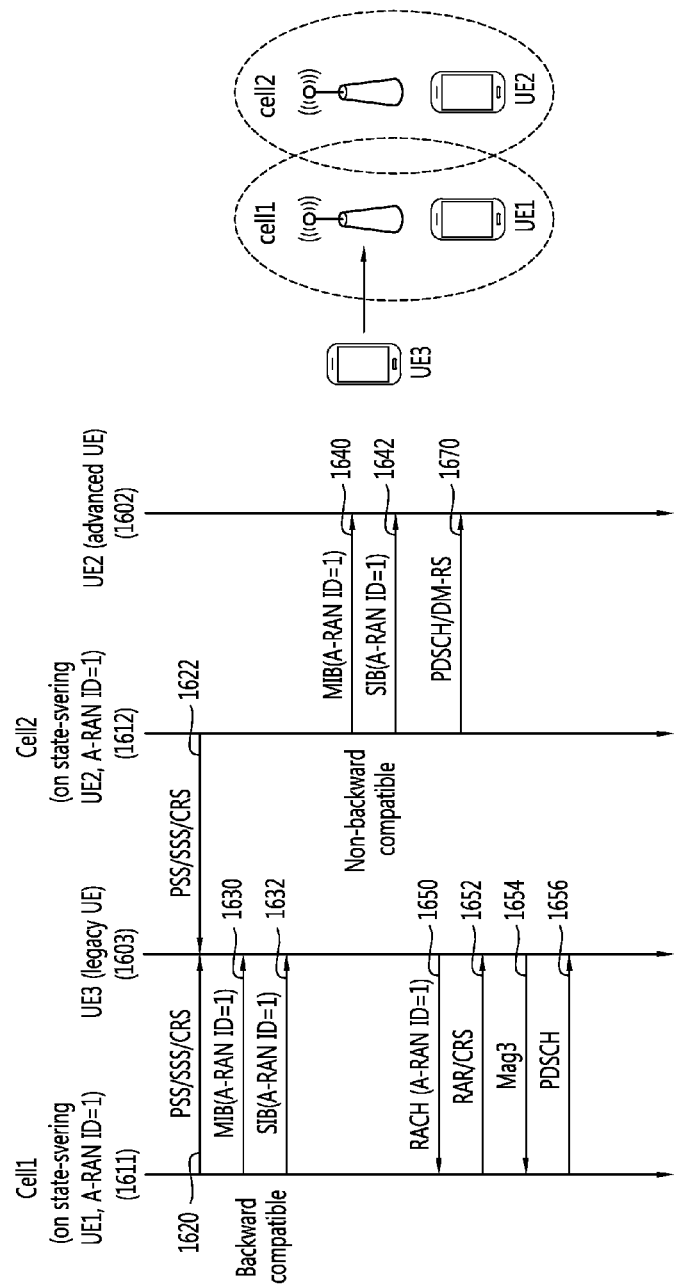
FIG. 16 shows an example of legacy UE and non-legacy UE coexistence which the present invention is applied.

FIG. 16 shows an example of legacy UE and non-legacy UE coexistence which the present invention is applied.

A master cell may follow legacy carrier protocol, e.g., transmitting CRS every subframe whereas other cells within the A-RAN may follow new carrier protocol e.g., not transmitting CRS. When a cell changes its type from new carrier type to legacy carrier type, it may notify the connected advanced UEs to be aligned. When a cell changes its type from legacy carrier type to new carrier type, it may hand-over legacy UEs to other legacy carriers before it changes its type.

When a connected cell changes its type from Legacy Carrier Type (LCT) to New Carrier Type (NCT), the UE Behavior is followed below. When a cell may not have any active legacy UEs, it may change its cell type to New Carrier Type since it allows better energy efficiency and spectral efficiency. First, if the cell is a master cell of an A-RAN, it shall hand-over its mater role to some other legacy carrier type cell before initiating cell type change. Either by cell-broadcast or higher layer signaling, each advanced UE is signaled with cell type change. In terms of effective time, the UE shall assume that the first activated subframe would not carry legacy PDCCH (or PCFICH) at least after 8 msec (or k >=8 msec). Since a UE may not be configured with ePDCCH, before activating new carrier type, first configuration of ePDCCH may be necessary.

At change of cell type from LCT to NCT, the following parameters may be given to UE either by UE-specific or cell-specific signaling, the parameters includes a Cell type change indication, Default ePDCCH configuration used for CSS, Starting symbol of ePDCCH, System information update if the UE shall reacquire system information, ePDCCH sets configuration or additional ePDCCH set configuration, Transmission mode if TM used before was based on CRS e.g., TM3. All or partial parameters will be given at cell type change.

Meanwhile, when a connected cell changes its type from NCT to LCT, when a cell is accessed by a legacy UE and it is decided that the legacy UE will be served by the cell, it may change its cell type from NCT to LCT so that the legacy UE can be served.

At change of cell type from NCT to LCT, the following parameters may be given to UE either by UE-specific or cell-specific signaling. The parameters includes Cell type change indication, ePDCCH set configuration if changed, Starting symbol of ePDCCH if changed, System information update, Transmission mode.

The effective time is determined by detecting a legacy PDCCH after 8 (or k >=8) msec after the indication. During RRC ambiguity or during cell type switching period, both legacy carrier and new carrier type information, e.g., PBCH and e-PBCH will be carried. FIG. 16 shows an example of legacy UE and non-legacy UE coexistence which the present invention is applied. As described, the UE 3 (legacy UE) receives PSS/SSS/CRS signals form cell1 and cell2, herein the cell1 is in on state as a serving cell for UE 1 and uses A-RAN ID=1 (1620, 1622). The cell2 is in on state as a serving cell for UE 2 and uses A-RAN ID=1. And then the UE 3 receives PBCH including MIB/SIB with A-RAN ID=1 from the cell1 (1630, 1632), the UE 2 (advanced UE) receives PBCH including MIB/SIB with A-RAN ID=1 from the cell2 (1640, 1642). And then, the UE chooses the cell1 to perform RACH procedure with A-RAN ID=1 and receives RAR/CRS (1650, 1652), and receives data transmission after transmitting Msg 3 (1654, 1656).

Cell Type Multiplexing can be supported. Another approach is considered to support both legacy UEs and advanced UEs effectively to enable both carriers types in one cell or carrier by FDM or TDM fashion. In terms of taking TDM approach, multiple methods are feasible as below. An ePDCCH set is used, for an advanced UE; the UE shall assume the ePDCCH monitoring subframes are based on new carrier type, i.e., no CRS, no PDCCH, etc. For legacy UEs, thus, those subframes cannot be used for ePDCCH monitoring subframe. More specifically, if starting OFDM symbol for the ePDCCH set is set to 0, UE shall assume that the ePDCCH monitoring subframes are based on new carrier type and assume legacy carrier type otherwise. Once the ePDCCH monitoring subframe is configured, the advanced UE shall acquire system information by legacy PDCCH and PBCH.

Separate subframe configurations for new carrier type subframes can be applied. If there are subframes which are configured for new carrier type, yet are not configured for ePDCCH monitoring subframes, a UE shall assume that subframes are used for MBSFN subframes or used for ePDCCH monitoring subframes even though ePDCCH monitoring subframe configuration are not configured as such.

NCT subframes by indication are applied. If an indication is enabled, e.g., TDM new carrier type indication, a UE shall assume all subframes except for subframes carrying system information or a set of prefixed subframes are based on new carrier type. For example, a set of prefixed subframes may include #0/#5 in each radio frame or #0 in each radio frame and #5/#25 in every 40 msec. If this indication is not enabled, a UE shall assume all subframes are based on legacy carrier type.

An ePDCCH set configuration with the indication bit is used. A carrier type that each ePDCCH set is based on may be configured individually where an indication bit can be configured per ePDCCH set, e.g., if the indication is enabled, the ePDCCH set monitoring subframes are based on new carrier type. The UE shall assume the ePDCCH monitoring subframes of the ePDCCH set configured with new carrier type are based on new carrier type and other subframes are based on legacy carrier type.

Separate subframe configurations per ePDCCH set is used. Another approach is to configure a separate list of subframes which are based on new carrier type per ePDCCH set. If the ePDCCH set monitoring subframes are configured, subframes belonging to both configurations are considered as new carrier type subframes and other subframes are considered as legacy carrier type subframes. The separate configuration per ePDCCH set would make more sense in TM10 scenario where each ePDCCH set is transmitted by different transmission point (i.e., DPS).

Figure 17:
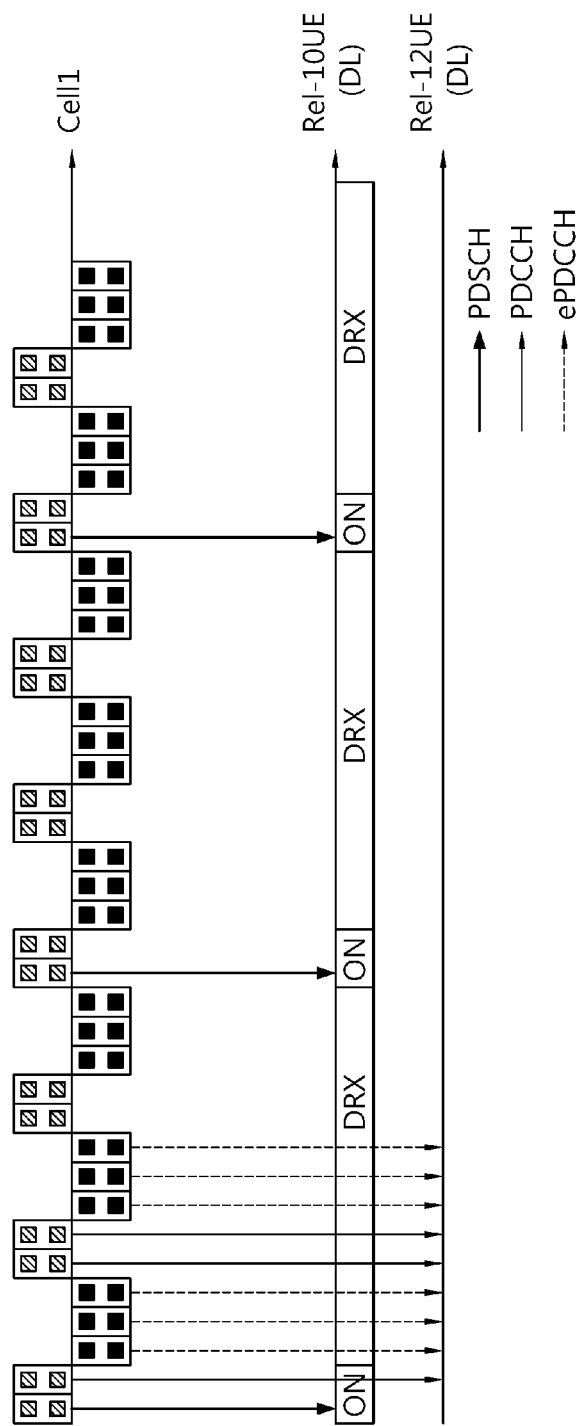
FIG. 17 shows an example of handling carriers with bitmap which the present invention is applied.

An example of handling legacy UEs and advanced UEs in the TDM-ed LCT and NCT subframes (in FDD) is shown in FIG. 17.

NCT bitmap is used for indicating LCT and NCT subframes for the UE, so that the UE can recognize that the NCT subframe carrying ePDDCH and LCT subframe carrying PDSCH/PDCCH. Herein, the bitmap is shown as 0011100111 . . . 00111, the 0 indicates the LCT subframe and the 1 indicates the NCT sunframe. In this example, the LCT and the NCT subframes has a pattern as 00111, the UE can receive the NCT bitmap pattern with 00111 via RRC configuration. The other signaling can also applied to indicate the NCT bitmap pattern for the UE.

Figure 18:
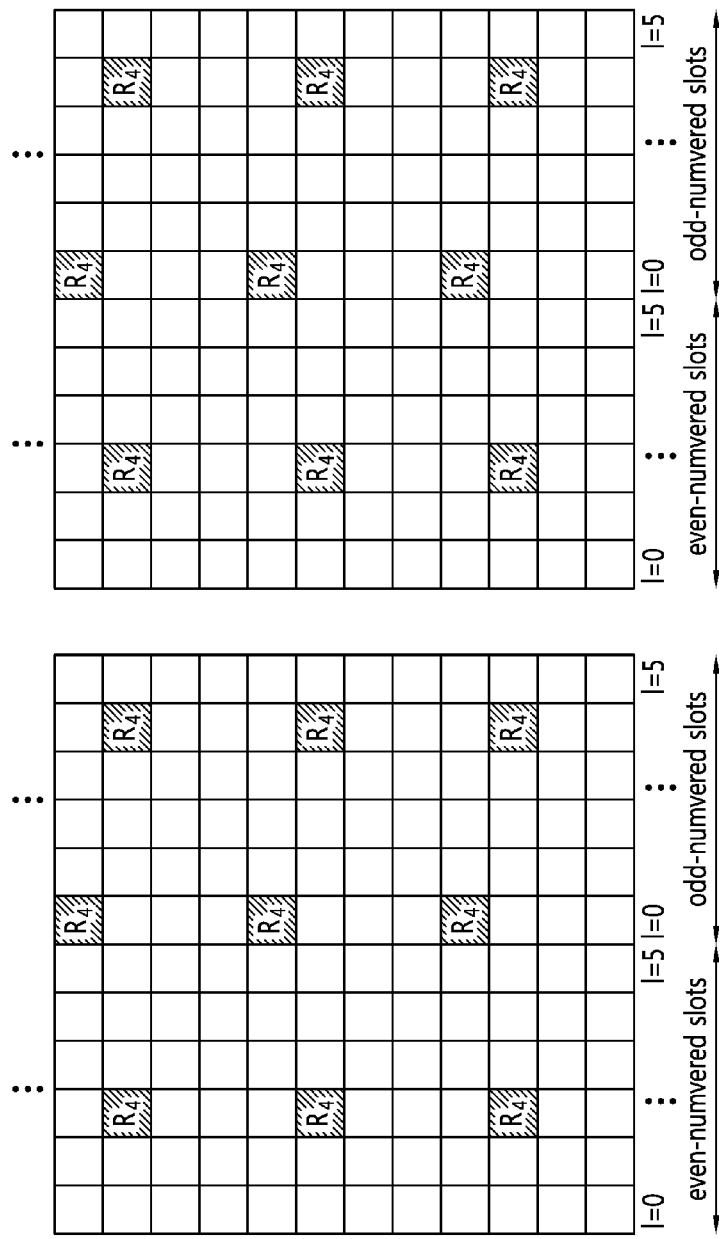
FIG. 18 shows an example of a new RS pattern which the present invention is applied.

Furthermore, MBSFN improvement in small cell and/or NCT is described below. MBSFN cyclic shift can be used with extended CP, normal CP and short CP, the short CP is smaller than normal CP currently defined in the specification. Which CP is used can be configured when a MBMS is configured. Or, depending on the cell type as small cell or macro cell, the CP can be chosen. In small cell indicated by eNB, UE may assume normal CP or short CP is used. MBSFN RS density, for specially low-speed UEs or indoor cases, the RS density can be reduced. A new MBSFN RS pattern can be introduced as prefixed type. An example is shown in FIG. 18. Any other RS patterns where reduced density can be considered in frequency domain or time domain can be considered. A higher layer configuration including the pattern, or used density or index to the used pattern can be signaled to UE via MBMS configuration or RRC signaling.

Figure 19:
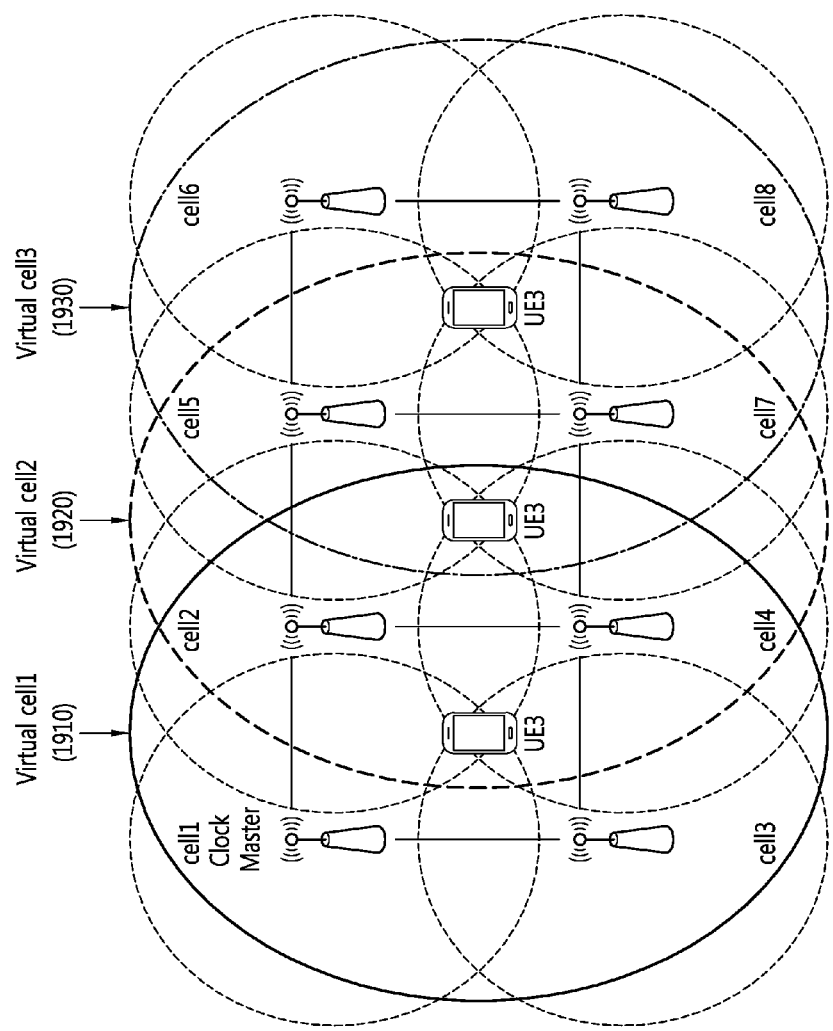
FIG. 19 shows an example of physical cells and virtual cells configuration which the present invention is applied.

A-RAN via RRM/RLM separation is more detailed. FIG. 19 is shown an illustration on how physical cells and virtual cells can be constructed.

A virtual cell1 includes cell1, cell3, and adjacent cell2 and cell4, virtual cell2 includes cell2, cell4, and adjacent cell5 and cell7, and virtual cell3 includes cell6, cell8, and adjacent cell5 and cell7. The UE can be configured with a SCell configuration or RRC configuration including information between a corresponding virtual cell and the belonged cell(s). Each cell may transmit discovery signal based on its physical cell ID and may transmit data/control based on the virtual cell ID.

Figure 20:
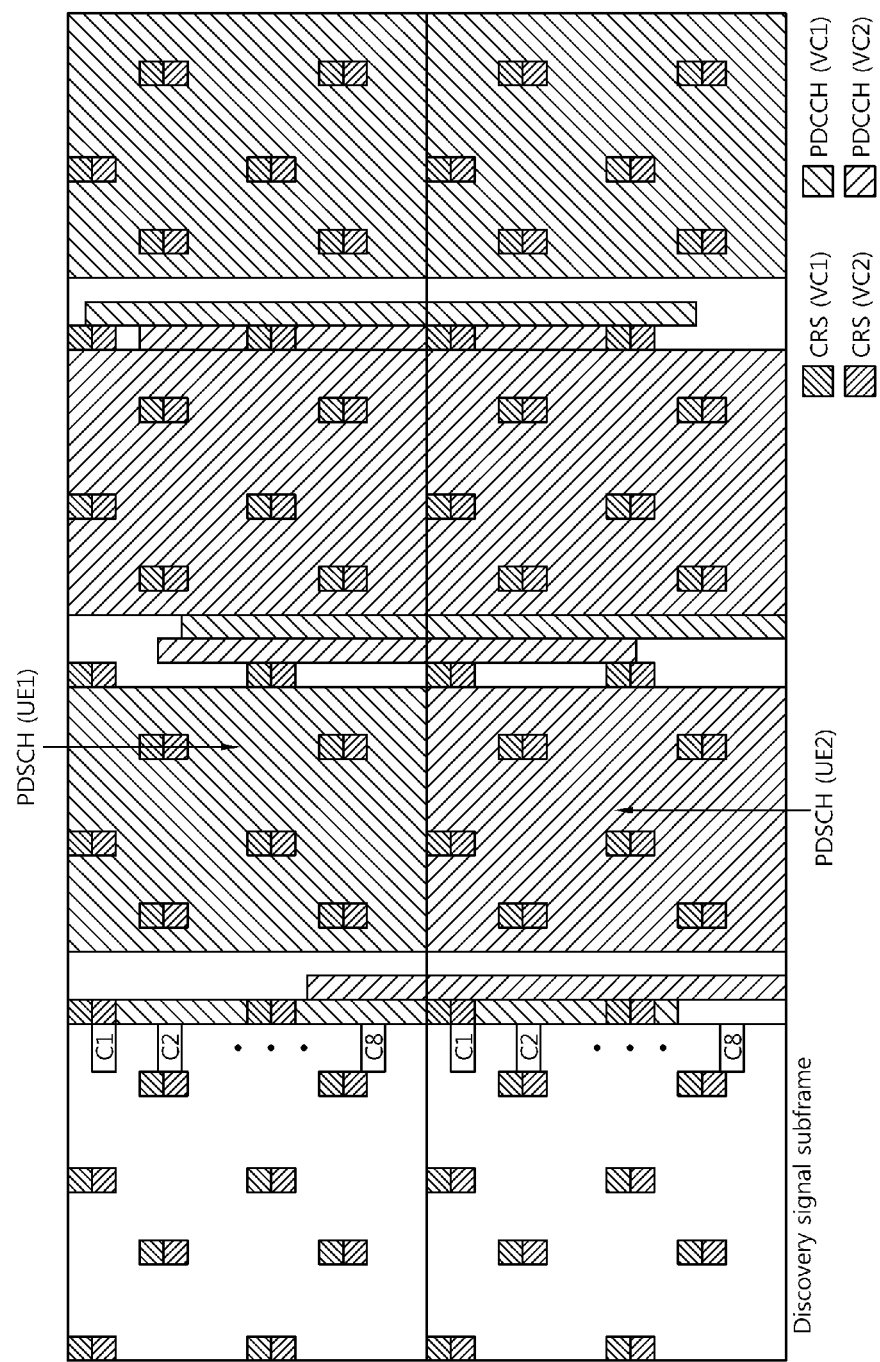
FIG. 20 and FIG. 21 show examples of transmitting PDCCH/PDSCH on multiple virtual cells which the present invention is applied.

One example of discovery signal transmission and data transmission is shown in below FIG. 20. The FIG. 20 shows an example of transmitting PDCCH/PDSCH on multiple virtual cells which the present invention is applied.

An example of PDCCH/PDSCH transmission from a physical cell as Cell2 is illustrated to support UE1 for virtual cell1 and UE2 for virtual cell2. In a subframe or multiple subframes, a set of discovery signals from each physical cell can be transmitted, e.g., CSI-RS based discovery signals from cell1 to cell8 which may be scrambled with physical cell ID. Based on discovery signals, each UE may perform radio resource monitoring measurement such as RSRP and/or RSRQ. Based on the RRM results, either the serving cell or the UE selects the best candidate cell for cell association. Upon receiving a request on association or wake-up from either UE or the serving cell, the candidate cell decides a virtual cell ID for the target UE and starts to transmit SIB and necessary information based on the selected virtual cell ID. The selected virtual cell ID should be informed to a UE either via higher layer signaling or via MIB or SIB transmission.

For example, if a UE is configured with a SCell which performs a virtual cell functioning, PCell can signal the relationship between physical cell ID of discovery signal cell ID and virtual cell ID via higher layer signaling. Once a UE is configured with the virtual cell ID, it shall perform the necessary RLM, CSI feedback, others based on the virtual cell ID rather than discovery signal ID. Another approach is to create a virtual cell ID is to use a physical cell ID and a user ID where an example of the user ID is C-RNTI given by the serving cell. A function output value f ∈[0, 503] which is derived as a function of the physical cell ID and the user ID. The value range can be changed to outside of physical cell ID such as [504, x] to avoid some confusion between physical cell ID and virtual cell ID. Or, discovery signal may be scrambled with virtual cell ID which is outside of current physical cell ID and then data transmission and other control signal transmission may be based on 504 cell IDs. If a UE does not have any serving cell, it may read or detect the cell based on PBCH or SIB transmission to acquire cell ID. Or, a UE determines the virtual cell ID following a pre-determined rule.

Once, the UE acquires all the necessary information, it initiates cell association. The shown example illustrates PDCCH/PDSCH transmission once the cell association has been completed. As cell2 supports two virtual cells with VC1 and VC2 for UE1 and UE2 respectively, it needs to transmit PDCCH/PDSCHs for UE1 and UE2 based on different cell ID (VC1 and VC2). Assuming a UE is receiving PDCCH instead of ePDCCH, or in addition to ePDCCH, it is also necessary to transmit two CRS based on the VC1 and the VC2 respectively.

As a physical cell may operate multiple virtual cells, a UE needs to be informed about the relationship between physical and virtual cells. Overall, two cases can be considered to determine mechanisms to inform the UE about the relationship.

A first case is when a UE accesses the cell via initial access without network assistance as an initial access operation, and the other case is when a UE accesses the cell via hand over or SCell or dual connectivity with network assistance as a network assistance operation.

When initial access operation is supported, it may not be easily feasible to assume a network assistance signaling to indicate the relationship between physical and virtual cells. Thus, some mechanisms for a UE to infer the relationship may be needed. Or, it may be assumed that the proposed concept in this invention may not be applied to UEs in RRC_IDLE mode. For a UE to infer the relationship between virtual and physical cell ID used for discovery signal and other signals such as CRS and DM-RS, one mechanism is to create a virtual cell ID based on physical cell IDs which forms the virtual cell. For example, one approach is to use VC_ID=[x1][x2][x3] assuming maximum three physical cells can form a virtual cell where virtual cell ID is determined as a function of concatenation of three physical cell IDs. Thus, by reading a virtual cell ID, a UE discovers that maximum three physical cells this UE can be associated with. The physical cell ID is determined by a concatenation of three virtual cell IDs where virtual cell IDs range would be [0, 168].

If network assistance's operation is supported, such as via hand-over, SCell configuration, dual connectivity, the relationship between a virtual cell and physical cell or relationship between cell ID used for RRM and cell ID used for RLM for the serving cell can be signaled by the network. When the operation occurs such as hand-over, SCell configuration or configuration of assisting eNB, the information can be propagated with the configuration such that a UE knows the cell ID used for RRM and RLM respectively.

Methods to transmit multiple CRS transmissions for multiple virtual cells from a physical cell are followed. When a physical cell participates in multiple virtual cells, it may have to transmit multiple CRS per each virtual cell unless CRS can be omitted in each virtual cell. As an example, it is assumed that a physical cell can be part of three virtual cells, namely virtual cell1, virtual cell2 and virtual cell3. Then, the cell transmits CRSs with three different cell IDs. As a UE expects to receive only one CRS, particularly with multiplexed with data, to transmit multiple CRS with different cell IDs needs further handling. Multiple approaches can be considered. Firstly, no PDSCH and CRS multiplexing is applied, one simple approach is to assign/dedicate PRBs and/or subframes where CRS is transmitted, and UE may assume that data will not be transmitted where CRS is going to be transmitted. For CRS rate matching, another option is that a UE is configured with a set of CRS REs to be rate-matched.

One approach is to configure a set of cell IDs or CRS resource configurations where data will be rate matched around. One example is to configure a set of cell IDs for virtual cells that physical cell is participating. Only one CRS transmission at a given resource with frequency/time/space is supported. It is similar to current approach, a UE may assume that only one CRS will be transmitted when data and CRS will be multiplexed. One approach to realize this is to perform TDM and/or FDM between virtual cells. For example, virtual cell1 transmits CRS in subframe #0 in center 6PRBs in every radio frame and virtual cell2 transmits CRS in subframe #1 in center 6PRBs in every radio frame and so on. The subframe index where CRS is transmitted may be associated with virtual cell ID. In terms of frequency, CRS may be transmitted either the entire subframe or partial of a set of PRBs. It can be further considered to indicate the time and/or frequency where CRS is transmitted per virtual cell or it can follow a pre-determined rule.

A different set of restricted measurement subframe set for each virtual cell is configured and CRS in those configured restricted measurement subframes is transmitted. Another approach is to transmit CRS only in a restricted measurement set subframes which may be configured differently per each virtual cell. It is similar to CRS transmission at a given resource, the UE may assume that only one CRS with one virtual cell ID will be transmitted in those subframes. In subframes not configured as restricted measurement subframe set, CRS scrambled with different virtual cell ID may be transmitted. If data is transmitted in those subframes, a UE shall assume that CRS is not be transmitted. However, a UE may be higher-layer configured with cell ID to perform CRS IC or a UE may perform CRS IC autonomously. Thus, in terms of actual transmission in those subframes, superposition of PDSCH and CRS may be performed and transmitted.

Figure 21:
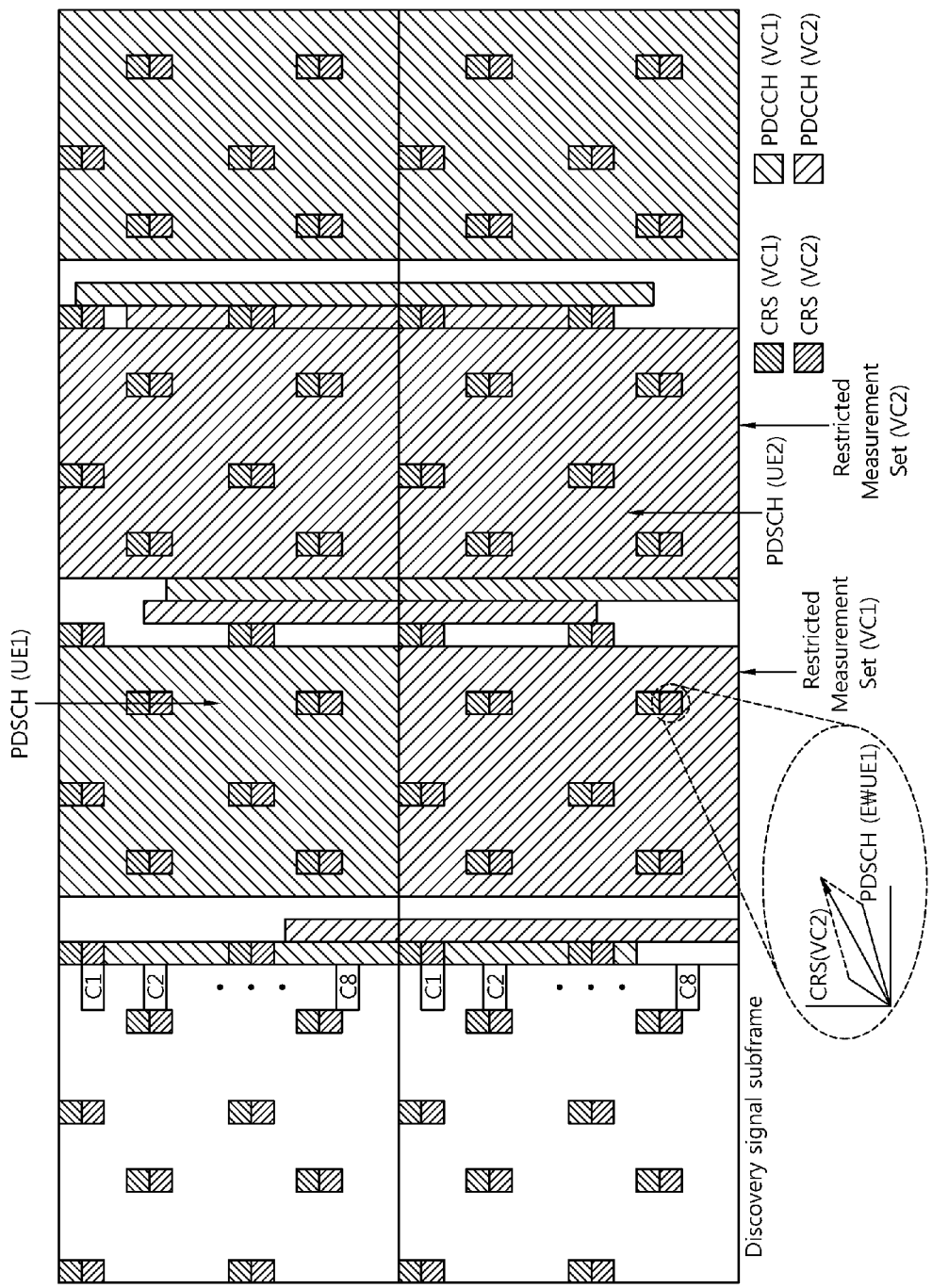

The FIG. 21 shows another example of transmitting PDCCH/PDSCH on multiple virtual cells which the present invention is applied.

In a restricted measurement subframe for each virtual cell, CRS scrambled with the virtual cell ID will not be multiplexed or superposed with data transmission. Other CRS transmission may be combined with data transmission. Alternatively, CRS may be transmitted only in subframes configured with restricted measurement set. In this case, for example, discovery subframe and the last subframe shown in FIG. 21 may not transmit CRS as those subframes are not configured as one of restricted measurement subframe set for any virtual cell. In that case, control channel may be based on ePDCCH only due to the lack of CRS for PDCCH demodulation.

When the option with the restricted measurement subframe for each virtual cell is used, a UE may perform RLM on those configured subframes only. In this case, a UE may perform RRM based on discovery signal which is separate from RLM procedure. When the option with the restricted measurement subframe for each virtual cell is used, in terms of multiplexing or superposition between CRS and PDCCH, the same principle used for data and CRS is used. In other words, a UE may assume that REs not used for CRS for the virtual cell and other necessary REs for PCFICH, PHICH will be used for PDCCH transmission. CRS for another virtual cell may not be assumed as rate-matched around. PDCCH and CRS for another virtual cell may be transmitted in a superposed fashion and then a UE may be able to read PDCCH successfully after canceling CRS for another virtual cell. In other words, from a UE perspective, virtual cells which are not the serving virtual cell will be treated as neighbor cells or interfering cells.

Figure 22:
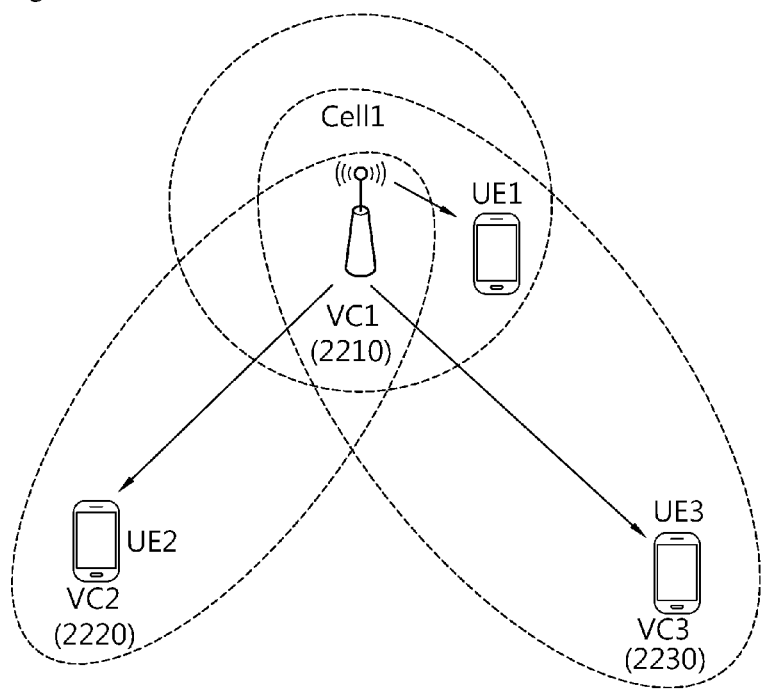
FIG. 22 shows an example of multiple virtual cells having different coverages which the present invention is applied.

The FIG. 22 shows an example of multiple virtual cells having different coverages which the present invention is applied.

An example of supporting multiple virtual cells by a physical cell would be a use case where multiple users and/or different application QoS should be supported by the cell. The physical cell1 serves UE1 which runs HD-video application and thus high data throughput with very low mobility, UE2 which runs VoIP with medium/low mobility and UE3 which is far from UE2 where UE3 may not find another cell in the coverage and thus may require cell expansion for UE3 to allow connectivity. In this case, the physical cell runs three different virtual cells which have different characteristics such as transmission power, beam, the usage of coverage expansion via repetition or others, the supported data rate, etc.

For example, VC1 supports high data rate with low maximum power. Thus, the transmission power on CRS will be limited. VC2 supports relatively medium/low data rate with beam forming. Thus, the transmission on CRS will be precoded targeting specific users. VC3 supports low data rate with coverage expansion. Thus, coverage expansion techniques such as repetition can be used. To allow different data rate, different configuration of restricted measurement sets for RLM can be configured. For example, VC1 has many subframes in the set configured as for measurement as it transmits multiple subframes per radio frame. VC2 and VC3 may have different subframe configurations where for example VC3 has a subset of subframes used for RLM measurement as one sample. For example, to support 5 dB coverage expansion, it is assumed that 5 times of repetition is used. In this case, RLM may be performed for 5 subframes to take one sample, i.e., accumulation over RS transmissions over 5 subframes for example, thus, configuration of RLM measurement set should take account of those aspects. Or, different radio frame structure may be used for each virtual cell. For example, VC1 uses a frame structure where 10 sub-subframe belongs to a subframe and VC2 uses subframe structure and VC3 uses super-subframe where 1 radio frame is used as a unit of transmission. To multiplex different virtual cells, one simple approach is to take TDM and/or FDM.

When different power is used with same frame structure, a UE may be able to decode RS/data successfully via cancellation of interference and proper power control when RS from a different virtual cell is superposed with data to the UE. To successfully cancel RS/data from virtual cells as non-serving-virtual cell, a UE can be configured with a list of cell IDs and/or RS configurations and/or RS transmission power and/or data cancellation assisting information via a higher-layer signaling.

Figure 23:
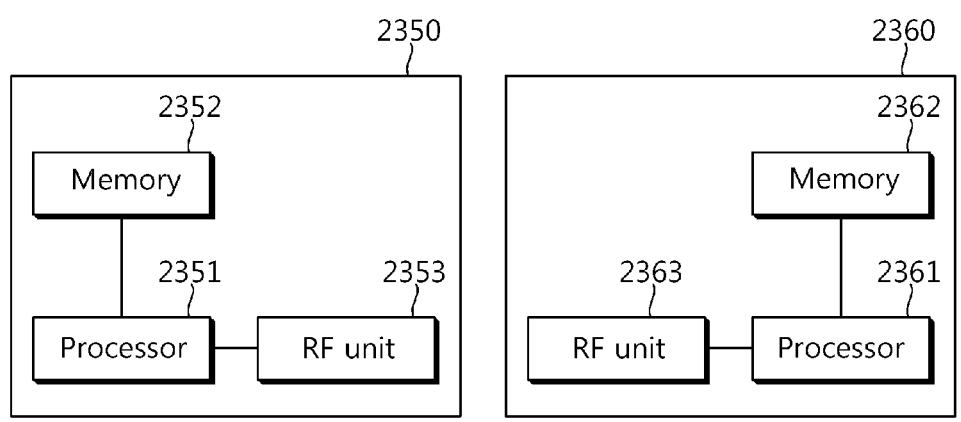
FIG. 23 shows a block diagram showing a wireless communication system according to an exemplary embodiment of the present invention.

FIG. 23 is a block diagram showing a wireless communication system according to an embodiment of the present invention.

A BS 2350 includes a processor 2351, a memory 2352, and a radio frequency (RF) unit 2353. The memory 2352 is coupled to the processor 2351, and stores a variety of information for driving the processor 2351. The RF unit 2353 is coupled to the processor 2351, and transmits and/or receives a radio signal. The processor 2351 implements the proposed functions, procedures, and/or methods. In the embodiments of FIG. 1 to FIG. 22, the operation of the BS can be implemented by the processor 2351.

Especially, the processor 2351 may configure one or more cells with different frequencies, for this invention the processor 2351 configures the cells to support Semi-Persistent Scheduling, Transmission Time Interval (TTI)-bundling, HARQ-ACK procedures. The processor 2351 may configure and transmit a configuration including virtual cell groups, the virtual cell group each including two more serving cells which are shared an identical virtual cell identification (ID). Also the processor 2351 may configure and transmit discovery signals scrambled with the identical virtual cell ID and system information including a physical random access channel (PRACH) configuration, via master cells each of the virtual cell groups. And then processor 2351 may perform a RACH procedure and data transmission via the selected cell by using the virtual cell ID with a UE.

The processor 2351 may configure and transmit the configuration using a SCell configuration, a hand-over configuration, a dual connectivity configuration, a transmission mode (TM) configuration, or a radio resource control (RRC) configuration via a PCell.

The processor 2351 may also configure that the configuration includes at least two sets of a relationship between an identical virtual cell ID for a discovery signal and a physical cell IDs of serving cells in a virtual cell group sharing the identical virtual cell ID, at least one of subframe sets of the virtual cell groups, and multiple subframes sets of the virtual cell group each, a set of the discovery signals transmitted from the serving cells in the virtual cell groups each, frequency hopping patterns each which is associated with the virtual cell groups each.

And the processor 2351 may also configure CRS patterns by the virtual cell ID each, the CRS patterns includes a start subframe, subframe set, and RB of the CRS in a radio frame. And the processor 2351 may also configure optionally that the restricted measurement subframe set for each virtual cell group is used, and measurement subframe set for each virtual cell group is used. It includes that the processor 2351 may configure a list(s) of cell IDs and/or RS configurations and/or RS transmission power and/or data cancellation assisting information for the virtual cell ID (as group) via a higher-layer signaling.

The wireless device 2360 includes a processor 2361, a memory 2362, and an RF unit 2363. The memory 2362 is coupled to the processor 2361, and stores a variety of information for driving the processor 2361. The RF unit 2363 is coupled to the processor 2361, and transmits and/or receives a radio signal. The processor 2361 implements the proposed functions, procedures, and/or methods. In the embodiments of the FIG. 1 to FIG. 22, the operation of the UE can be implemented by the processor 2361.

Especially, the processor 2361 may configure one or more cells with different frequencies, for this invention the processor 2361 configures the cells to support Semi-Persistent Scheduling, TTI-bundling, HARQ-ACK procedures. The processor 2361 may receive and configure a configuration including virtual cell groups, the virtual cell group each including two more serving cells which are shared an identical virtual cell identification (ID). Also the processor 2361 may configure and receive discovery signals scrambled with the identical virtual cell ID and system information including a physical random access channel (PRACH) configuration, via master cells each of the virtual cell groups. And then processor 2361 may perform a RACH procedure and data transmission via the selected cell by using the virtual cell ID with a UE.

The processor 2361 may configure and receive the configuration using a SCell configuration, a hand-over configuration, a dual connectivity configuration, a transmission mode (TM) configuration, or a radio resource control (RRC) configuration via a PCell. The processor 2361 may also configure that the configuration includes at least two sets of a relationship between an identical virtual cell ID for a discovery signal and a physical cell IDs of serving cells in a virtual cell group sharing the identical virtual cell ID, at least one of subframe sets of the virtual cell groups, and multiple subframes sets of the virtual cell group each, a set of the discovery signals transmitted from the serving cells in the virtual cell groups each, frequency hopping patterns each which is associated with the virtual cell groups each. And the processor 2361 may also configure CRS patterns by the virtual cell ID each, the CRS patterns includes a start subframe, subframe set, and RB of the CRS in a radio frame. And the processor 2361 may also configure optionally that the restricted measurement subframe set for each virtual cell group is used, and measurement subframe set for each virtual cell group is used. It includes that the processor 2361 may configure a list(s) of cell IDs and/or RS configurations and/or RS transmission power and/or data cancellation assisting information for the virtual cell ID (as group) via a higher-layer signaling.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for performing, at a wireless device, data transmission in a wireless communication system, the method comprising:
  receiving a configuration including a plurality of virtual cell groups, each of the virtual cell groups including two or more serving cells which share an identical virtual cell identification (ID);
  receiving discovery signals scrambled with the identical virtual cell ID and system information including a physical random access channel (PRACH) configuration, from master cells of each of the virtual cell groups;
  selecting a cell based on the discovery signals and the system information; and
  performing a random access channel (RACH) procedure and data transmission by using the virtual cell ID of the selected cell.

2. The method of claim 1, wherein the configuration is received by a serving cell (SCell) configuration, a hand-over configuration, a dual connectivity configuration, a transmission mode (TM) configuration, or a radio resource control (RRC) configuration from a primary cell (PCell).

3. The method of claim 1, wherein the configuration includes at least two sets of a relationship between an identical virtual cell ID for a discovery signal and a physical cell ID of serving cells in a virtual cell group sharing the identical virtual cell ID.

4. The method of claim 3, wherein the configuration includes at least one of subframe sets of the virtual cell groups, and multiple subframes sets of each of the virtual cell groups, and a set of the discovery signals transmitted from the serving cells in each of the virtual cell groups.

5. The method of claim 1, wherein the configuration includes a frequency hopping pattern which is associated with the identical virtual cell ID.

6. The method of claim 1, wherein the receiving the discovery signals includes:
 receiving a first discovery signal scrambled with a first virtual cell ID from a first master cell at a first subframe; and
 receiving a second discovery signal scrambled with a second virtual cell ID from a second master cell at a second subframe.

7. The method of claim 1, wherein the selecting the cell includes:
 performing a radio resource monitoring measurement by measuring a reference signal received power (RSRP) or a reference signal received quality (RSRQ) of two sets of the discovery signals scrambled with the identical virtual cell ID,
 wherein the measurement is configured with a set of different radio frames based on the wireless device's mobility.

8. The method of claim 1, wherein the performing the RACH procedure includes:
 transmitting a PRACH preamble sequence scrambled with the virtual cell ID of the selected cell; and
 receiving a response for the PRACH preamble sequence by decoding a reference signal (RS) scrambled with the virtual cell ID of the selected cell,
 wherein the RS includes a cell—specific reference signal (CRS), the CRS is set by the virtual cell ID, and a power of the CRS is set by the virtual cell ID.

9. The method of claim 8, further including:
 receiving a first CRS scrambled with a first virtual cell ID in subframe #0 in a center six physical resource blocks (6PRBs) in a radio frame, and a second CRS scrambled with a second virtual cell ID in subframe #1 in the center 6PRBs in the radio frame.

10. A wireless device for performing data transmission in a wireless communication system, the wireless device comprising:
 a radio frequency (RF) unit configured to transmit and receive a radio signal; and
 a processor operatively coupled to the RF unit, wherein the processor is configured to:
  receive a configuration including a plurality of virtual cell groups, each of the virtual cell groups including two or more serving cells which share an identical virtual cell identification (ID);
  receive discovery signals scrambled with the identical virtual cell ID and system information including a physical random access channel (PRACH) configuration, from master cells of each of the virtual cell groups;
  select a cell based on the discovery signals and the system information; and
  perform a random access control channel (RACH) procedure and data transmission by using the virtual cell ID of the selected cell.

11. The wireless device of claim 10, wherein the configuration includes at least two sets of a relationship between an identical virtual cell ID for a discovery signal and a physical cell ID of serving cells in a virtual cell group sharing the identical virtual cell ID, at least one of subframe sets of the virtual cell groups, and multiple subframes sets of each of the virtual cell groups, a set of the discovery signals transmitted from the serving cells in each of the virtual cell groups, and frequency hopping patterns each of which is associated with each of the virtual cell groups.

12. The wireless device of claim 10, wherein the processor is further configured to:
 receive a first discovery signal scrambled with a first virtual cell ID from a first master cell at a first subframe; and
 receive a second discovery signal scrambled with a second virtual cell ID from a second master cell at a second subframe.

13. The wireless device of claim 10, wherein the processor is further configured to:
 perform a radio resource monitoring measurement by measuring a reference signal received power (RSRP) or a reference signal received quality (RSRQ) of two sets of the discovery signals scrambled with the identical virtual cell ID,
 wherein the measurement is configured with a set of different radio frames based on the wireless device's mobility.

14. The wireless device of claim 10, wherein the processor is further configured to:
 transmit a PRACH preamble sequence scrambled with the virtual cell ID of the selected cell; and
 receive a response for the PRACH preamble sequence by decoding a reference signal (RS) scrambled with the virtual cell ID of the selected cell,
 wherein the RS includes a cell—specific reference signal (CRS), the CRS is set by the virtual cell ID, and a power of the CRS is set by the virtual cell ID.

15. The wireless device of claim 14, wherein the processor is further configured to:
 receive a first CRS scrambled with a first virtual cell ID in subframe #0 in a center six physical resource blocks (6PRBs) in a radio frame, and a second CRS scrambled with a second virtual cell ID in subframe #1 in the center 6PRBs in the radio frame.

* * * * *